(12) United States Patent
Okamoto et al.

(10) Patent No.: US 7,731,904 B2
(45) Date of Patent: Jun. 8, 2010

(54) METHOD FOR MAKING PROBE SUPPORT AND APPARATUS USED FOR THE METHOD

(75) Inventors: Tadashi Okamoto, Kanagawa (JP);
Nobuko Yamamoto, Kanagawa (JP);
Hidenori Watanabe, Kanagawa (JP);
Tomohiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,253

(22) Filed: Sep. 17, 2001

(65) Prior Publication Data

US 2002/0182610 A1 Dec. 5, 2002

(30) Foreign Application Priority Data

Sep. 19, 2000 (JP) ............................. 2000-284046
Feb. 19, 2001 (JP) ............................. 2001-042344

(51) Int. Cl.
*B01L 3/02* (2006.01)
*B05C 5/02* (2006.01)

(52) U.S. Cl. ...................... 422/100; 422/103; 422/104; 118/313; 118/315

(58) Field of Classification Search ................ 422/68.1, 422/100; 435/6, 174, 287.2; 536/23.1
See application file for complete search history.

(56) References Cited

U.S. PATENT DOCUMENTS

| 5,144,466 | A | | 9/1992 | Nakamura et al. | ........... 359/123 |
| 5,218,376 | A | | 6/1993 | Asai | ........................... 346/1.1 |
| 5,338,688 | A | | 8/1994 | Deeg et al. | .................... 436/180 |
| 5,343,314 | A | | 8/1994 | Nakamura et al. | ........... 359/123 |
| 5,424,186 | A | | 6/1995 | Fodor et al. | ..................... 435/6 |
| 5,481,705 | A | | 1/1996 | Watanabe et al. | ........... 395/650 |
| 5,576,748 | A | * | 11/1996 | Tamura | ........................ 347/58 |
| 5,658,802 | A | | 8/1997 | Hayes et al. | ................. 436/518 |
| 5,694,330 | A | | 12/1997 | Iwamura et al. | .............. 364/496 |
| 5,697,144 | A | * | 12/1997 | Mitani et al. | ................... 29/611 |
| 5,815,173 | A | | 9/1998 | Silverbrook | ................. 347/15 |
| 5,847,105 | A | | 12/1998 | Baldeschwieler et al. | .. 536/25.3 |
| 5,958,342 | A | * | 9/1999 | Gamble et al. | .............. 422/100 |
| 6,001,309 | A | | 12/1999 | Gamble et al. | .............. 422/100 |
| 6,033,544 | A | * | 3/2000 | Demers et al. | .............. 204/450 |
| 6,083,763 | A | * | 7/2000 | Balch | ......................... 436/518 |
| 6,103,199 | A | * | 8/2000 | Bjornson et al. | ............ 422/100 |
| 6,309,891 | B1 | * | 10/2001 | Shalon et al. | ................ 436/180 |

(Continued)

FOREIGN PATENT DOCUMENTS

EP 0 498 291 1/1992

(Continued)

*Primary Examiner*—B J Forman
(74) *Attorney, Agent, or Firm*—Fitzpatrick, Cella, Harper & Scinto

(57) ABSTRACT

A liquid discharging device includes a plurality of liquid discharge sections. Each liquid discharge section includes a reservoir, a nozzle that discharges a solution supplied from the reservoir, and discharge energy generating means that generates energy to discharge the solution from the nozzle. The number of the liquid discharge sections corresponds to the number of probe types to be formed. The nozzles are two-dimensionally arranged. Using this liquid discharging device, probe liquids are discharged from the corresponding reservoirs onto a solid-phase substrate to form a predetermined two-dimensional probe array of high-purity probes on the substrate. This process exhibits high reproducibility and processability, and the resulting probe array has high array density.

12 Claims, 24 Drawing Sheets

U.S. PATENT DOCUMENTS

| | | | |
|---|---|---|---|
| 6,321,182 B1 | 11/2001 | Suzuki | 703/14 |
| 6,461,812 B2 * | 10/2002 | Barth et al. | 435/6 |
| 6,830,621 B2 * | 12/2004 | Udagawa et al. | 118/313 |

FOREIGN PATENT DOCUMENTS

| | | |
|---|---|---|
| EP | 0 703 825 B1 | 7/1997 |
| EP | 0 895 082 A2 | 7/1998 |
| JP | 4-10940 | 1/1992 |
| JP | 4-10941 | 1/1992 |
| JP | 4-10942 | 1/1992 |
| JP | 6-40037 | 2/1994 |
| JP | 11-187900 | 7/1999 |
| WO | WO 95/03350 | 2/1995 |
| WO | 97/15394 | 1/1997 |
| WO | WO 97/15394 * | 5/1997 |
| WO | 01/89694 | 11/2001 |

* cited by examiner

FIG. 6A  FIG. 6C
FIG. 6B  FIG. 6D
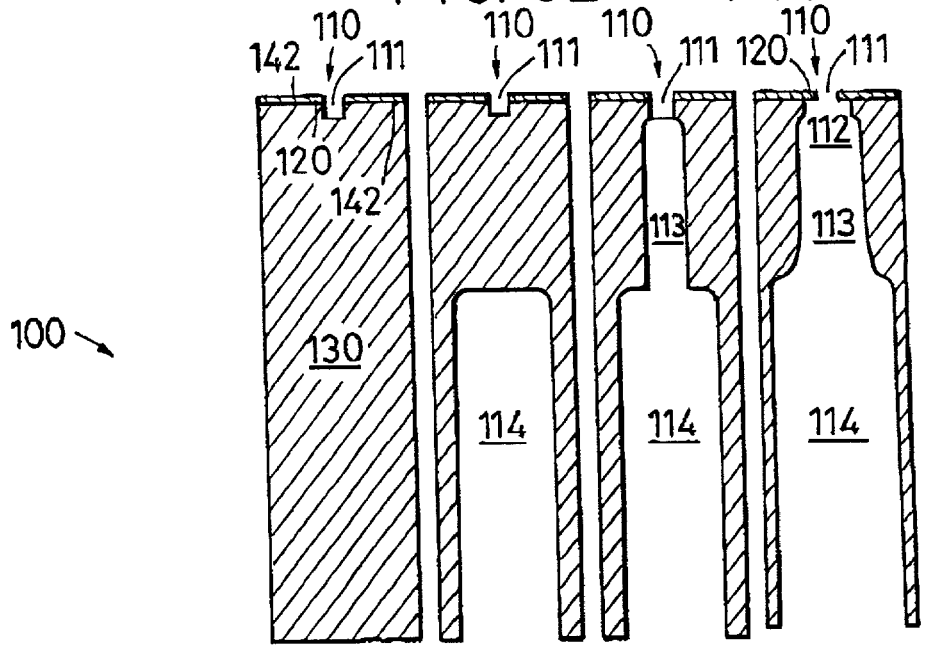
FIG. 7
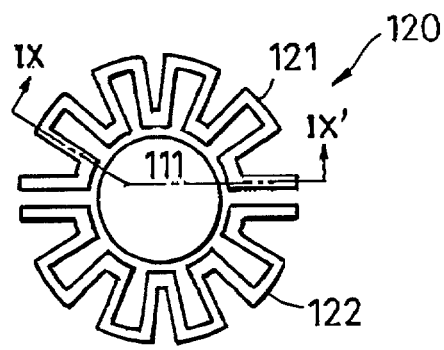
FIG. 8
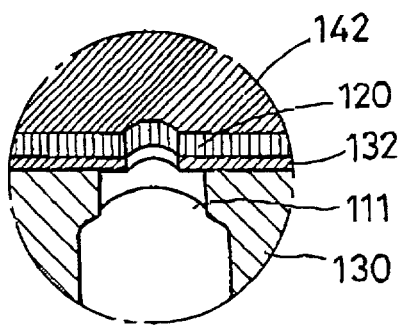

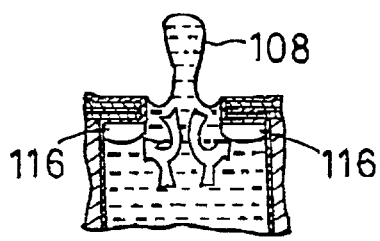
FIG. 22A
FIG. 22B
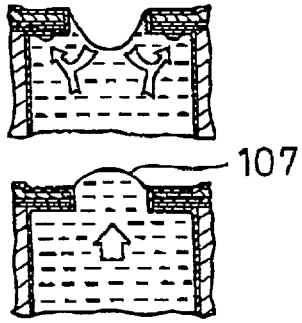
FIG. 22C
FIG. 22D
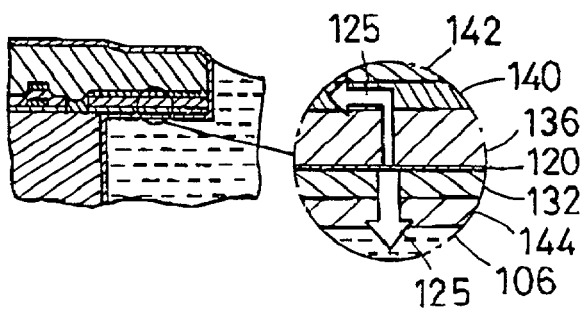
FIG. 23
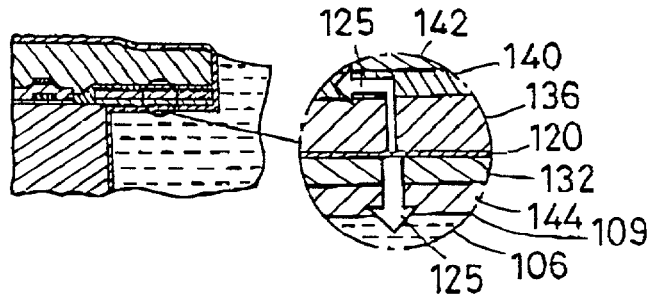
FIG. 24

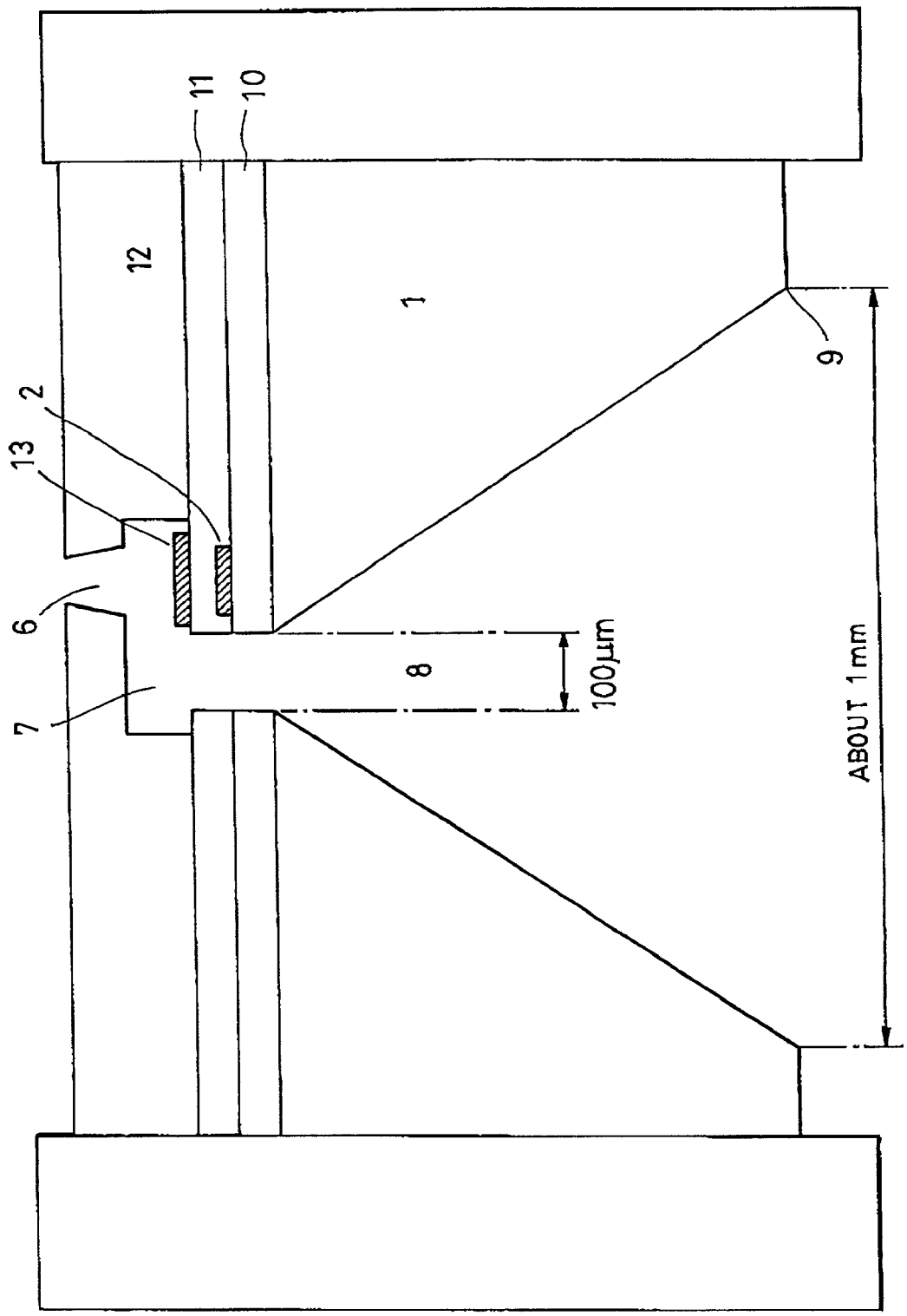

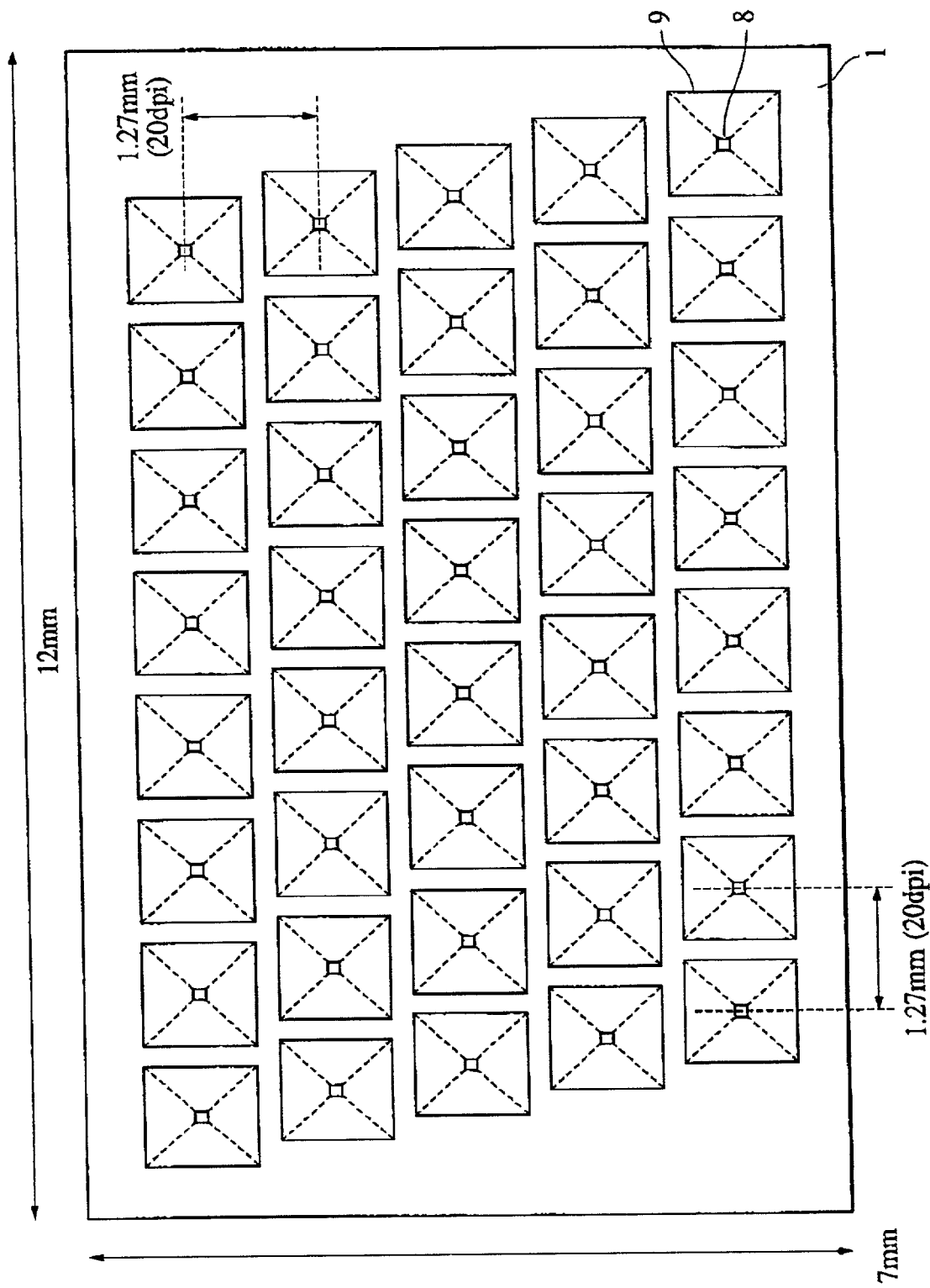

FIG. 43

|   | 1 | 2 | 3 | 4 | 5 |
|---|---|---|---|---|---|
| A | ○ | ○ | ○ | ○ | ○ |
| B | ○ | ○ | ○ | ○ | ○ |
| C | ○ | ○ | ○ | ○ | ○ |
| D | ○ | ○ | ○ | ○ | ○ |
| E | ○ | ○ | ○ | ○ | ○ |
| F | ○ | ○ | ○ | ○ | ○ |
| G | ○ | ○ | ○ | ○ | ○ |
| H | ○ | ○ | ○ | ○ | ○ |

METHOD FOR MAKING PROBE SUPPORT AND APPARATUS USED FOR THE METHOD

BACKGROUND OF THE INVENTION

1. Field of the Invention

The present invention relates to a method for making a probe support on a solid-phase substrate and an apparatus used for the method. This apparatus includes a liquid discharging device for two-dimensionally arranging and fixing the probe array on the solid-phase substrate.

2. Description of the Related Art

In base sequence analysis of gene DNAs and gene examination of simultaneous multiple items with high reliability, DNAs having objective base sequences must be identified using a plurality of probes. DNA microchips have lately attracted attention as means for providing the plurality of probes which are used in the identification. Furthermore, high-throughput screening of pharmaceuticals and combinatorial chemistry requires methodical screening in which many objective proteins and drugs (for example, 96, 384, or 1,536) are arranged. Technologies developed for these purposes include methods for arranging many drugs, automatic screening processes, dedicated apparatuses, and software for controlling a series of screening operations and for statistically processing the results.

In a parallel screening operation, a probe array is basically used to detect the interactions and reactions on the probes under the same conditions in which the probe array includes many known probes which select substances to be evaluated. In general, the interactions and reactions on the probes which are used are preliminarily determined; hence, probes loaded in one probe array belong to the same type or category in a large classification, for example, a group of DNA probes having different base sequences. That is, substances used in a group of probes are, for example, DNAs, proteins, and synthetic chemical substances (drugs). In many cases, the probe array used includes plural probe groups. However, some screening operations allow the use of an array of probes including DNAs having the same base sequence, proteins having the same amino acid sequence, and the same chemical substance, the array having many points of these constituents. These arrays are mainly used in drug screening and the like.

In a probe array including different groups of probes, each group generally includes a group of DNAs having different base sequences, a group of proteins having different amino acid sequences, and a group of different chemical substances, and these constituents are arranged into an array according to a predetermined order on a substrate. In particular, a DNA probe array is used in base sequence analysis of gene DNAs and highly reliable gene examination of simultaneous multiple items.

One of the requirements for a probe array including different groups of probes is to arrange as many types of probe as possible, for example, DNA probes having many types of base sequence on one substrate, in other words, to arrange these probes as densely as possible.

U.S. Pat. No. 5,424,186 discloses a method for fixing plural types of probe into an array on a substrate. The array of DNA probes having different base sequences is prepared on the substrate by a successive extension reaction of DNAs on a solid-phase substrate using a photodegradable protective group and a photolithographic process. According to this method, the resulting DNA probe array can contain 10,000 or more types of DNA having different sequences per 1 $cm^2$. In this DNA synthesis by the successive extension reaction, the photolithographic process is repeated for each of the four bases (A, T, C, and G) using dedicated photomasks to selectively extend these bases at predetermined positions in the array. Plural types of DNA having required base sequences are thereby synthesized on the substrate in a predetermined array. Thus, the production costs and time required increase with the length of the DNA chains. Furthermore, the synthetic yield of nucleotide synthesis in each extension step is not 100%; hence, the proportion of DNAs having base sequence defects is large. In addition, the use of the photodegradable protective group results in a lower synthetic yield rate compared with the use of a general acidolyzable protective group; hence, the proportion of DNAs having designed base sequences will not be necessarily high in the final array product.

Since the product is directly synthesized in the solid-phase substrate, DNAs having base sequence defects cannot be removed from the DNAs having designed base sequences. Moreover, the base sequences of the synthetic DNAs in the final array on the substrate cannot be identified. This is the most significant and essential problem in this method. If a defective product without extension of a predetermined base in some extension steps is yielded due to an erroneous procedure, screening using this product will produce erroneous results. However, there is no way to prevent such results.

Another method is proposed in which DNAs for probes are preliminarily synthesized, purified, and subjected to confirmation of the lengths of the bases, if necessary, and each DNA is applied onto a substrate by a device such as a microdispenser to make a probe array. PCT publication WO95/3350 discloses a method for supplying DNAs on a membrane by a capillary. This method principally enables the formation of an array of about 1,000 DNAs per square centimeter. In this method for making the probe array, a solution of each probe is applied at predetermined positions on the substrate by one capillary dispenser and this procedure is repeated. If a dedicated capillary is prepared for each probe, no problems will arise. However, if a small number of capillaries are used to repeat the same procedure, the capillaries must be thoroughly washed before changing the type of probe in order to prevent contamination. Moreover, positions to be applied must be controlled for every procedure. Accordingly, this method is not necessarily suitable for making an array containing many types of probe and having high density. Since the probe solution is applied to the substrate by tapping the tip of the capillary thereon, reproducibility and reliability are not perfect.

For 96-well microplates and 384-well microplates used in high-throughput screening of drugs, a microdispenser device for supplying different drug solutions to individual wells is commercially available from, for example, Robbins Scientific (Trade name: HYDRA). In this device, microsyringes are two-dimensionally arranged and the minimum discharge volume thereof is 100 nl. When this device is applied to the formation of an array, the array density is limited by the minimum discharge volume, inhibiting the formation of a higher density array.

In other known methods, a solution of a substance required for solid-phase synthesis of a DNA is applied onto a substrate by an inkjet process for each extension step. For example, European Examined Patent Publication No. EP 0 703 825B1 discloses a method of solid-phase synthesis of plural types of DNA having predetermined base sequences. In this method, nucleotide monomers and activators, which are used in solid-phase synthesis of DNAs, are supplied through individual piezo-jet nozzles. The application using this inkjet process is highly reliable due to high reproducibility in the discharge volume compared with the application of the solution using the above capillary and is suitable for making higher-density probe arrays. Since this method also involves successive extension reactions of DNAs on the substrate, the method has the same problems described in U.S. Pat. No. 5,424,186 above: for example, the base sequences of DNAs synthesized on the substrate cannot be confirmed. This method is free from problems inherent in photolithography using a dedicated mask for every extension step, but has a problem in that predetermined probes may be fixed to individual points. In addition, this patent only discloses a method using a small number of piezo-jet nozzles which are separately provided. Thus, this method using these nozzles is not necessarily suitable for making high-density probe arrays, like the above method using the capillary.

U.S. Pat. No. 5,658,802 describes that "the invention provides apparatus and methods for making arrays of functionalized binding sites on a support surface. The invention further provides apparatus and methods for sequencing oligonucleotides and for identifying the amino acid sequence of peptides that bond to biologically active macromolecules, by specifically binding biologically active macromolecules to arrays of peptides or peptide mimetics."

U.S. Pat. No. 5,847,105 described that "a method and apparatus are provided for preparing a substrate upon which is located microdrop-sized loci at which chemical compounds are synthesized or diagnostic tests are conducted. The loci are formed by applying microdrops from a dispenser from which a microdrop is pulse fed onto the surface of the substrate."

U.S. Pat. No. 5,658,802 describes that "arrays of electromechanical dispensers are used to form extremely small drops of fluid and locate them precisely on substrate surfaces in miniature arrays. The printed arrays may consist of DNA, immunoassay reagents or the like. A positioning support such as an X-Y table moves the dispensing devices and substrate surfaces relative to each other to locate the drops on the substrates in predetermined patterns. Arrays of probes as dense as one thousand per square centimeter with center-to-center spacing as small as twenty-five micrometers are formed".

Japanese Unexamined Patent No. 11-187900 discloses a method for forming spots containing probes on a solid phase in which a probe solution is applied onto the solid phase through a thermal inkjet head. A known inkjet head for general printers is used as a device for discharging the solution in this method. However, the structure of this head is not always suitable for making probe arrays.

Inkjet heads for printing are developed for printing characters and images. Thus, monochrome (generally black) printing requires one color (black) ink, and color printing generally requires three primary color inks of yellow (Y), cyan (C) and magenta (M). Although some color printing processes use concentrated and diluted inks of black or Y, M, and C, if necessary, the number of types of ink is at most ten.

A conventional head for inkjet printing, which discharges large volumes of inks onto paper, is provided with containers (reservoirs) for storing sufficient ink, nozzles for discharging the inks, and ink channels for conducting the inks to the nozzles.

In contrast, it is preferred that the liquid discharging device used in the production of probe arrays discharge as many types of solution as possible. In a liquid discharging device having plural nozzles, it is preferred that the number of reservoirs provided be equal to the number of these nozzles.

Since large volumes of solutions are not consumed in the production of probe arrays by the liquid discharging to device compared with printing on paper by general purpose inkjet heads, the volume of the reservoirs of the liquid discharging device may be relatively small.

In general purpose inkjet printing heads, a predetermined ink must be discharged onto a predetermined position of the paper to form characters and images. Thus, these heads have a structure which allows each nozzle to be independently selected at any one time. This structure results in a complicated head configuration.

In contrast, the liquid discharging device used in the production of probe arrays does not necessarily require a structure for independently selecting each nozzle at any one time.

As described above, in the conventional general purpose inkjet printing heads having a head structure which allows each nozzle to be independently selected at any one time, power transistors and logic circuits, which are necessary for discharging the inks through predetermined nozzles, may be provided outside or inside the head.

Types of jet for discharging the liquid are classified into a thermal jet type for discharging the liquid by thermal energy from a heater and a piezo-jet type for discharging the liquid by deformation of a piezoelectric element by a voltage applied thereto. The thermal jet type has a simple structure compared with the piezo-jet type and is suitable for miniaturization of heads and formation of multinozzle heads. Thus, the thermal jet type is suitable for production of probe arrays using a liquid discharging device having many nozzles.

Printing heads for the current thermal jet type are provided with many nozzles, for example, 128 or 256 for each color for the purpose of improving the printing rate. Since the number of signals for determining ink discharge from the nozzles increases with an increase in the number of nozzles, the number of contact points between the head and the exterior increases. In order to overcome this problem, the head is provided with power transistors for driving heaters, a shift register for transmitting data including characters and images to be printed, a decoder, and an AND circuit, a NAND circuit, and the like to reduce the number of contact points.

The head provided with the power transistors and logic circuits is generally composed of silicon, with devices such as MOS transistors and bipolar transistors being formed therein As described above, semiconductor devices are generally formed in the printing head in a conventional method. This method requires a complicated manufacturing process which causes increased costs and a decreased head yield. The decrease in yield is particularly noticeable as the number of nozzles increases, that is, as the number of circuits in the head increases.

As described above, a liquid discharging device for making probe arrays requires many nozzles, for example, 1,000 or more nozzles. If the configuration of a conventional inkjet head is applied without modification to this liquid discharging device, an increase in cost and a decrease in yield are inevitable.

In the case of manufacturing a probe array including an arrangement of different solutions which is formed by discharging different solutions through plural nozzles, the probe array can be formed by one-shot discharge through each nozzle in most cases, and the positions for discharging the solutions can be preliminarily determined. Thus, a complicated discharge control is not always necessary in the production of the probe array by this method, unlike printing on paper. Accordingly, an inexpensive liquid discharging device having a simplified structure and a high yield is desired.

SUMMARY OF THE INVENTION

As described above, conventional methods for making probe arrays have some problems as regards reproducibility and simplicity in high-density production of the arrays including many types of probe on substrates. Thus, for example, a novel method for making a two-dimensional array having high density according to a predetermined sequence order while preliminarily confirming the base sequences of many types of DNA probe is required.

An object of the present invention is to provide a method for making a two-dimensional probe array in which as many unnecessary components as possible are removed and plural types of high-purity and high-density probe are arranged according to a predetermined sequence order with high reproducibility and processability. Another object of the present invention is to provide a liquid discharging device having a structure which is suitable for this method, and an apparatus for making a probe array including the liquid discharging device.

In particular, an object of the present invention is to provide a method for making a probe array in which various types of high-density probe array can be readily produced with high reproducibility on many substrates and to provide various devices and apparatuses used in this method.

The present inventors have intensively researched to solve the above problems and found the following.

(1) Plural types of probe to be used are separately produced and purified, and are identified as objective probes if necessary. When probe solutions containing these high-purity probes are applied onto a substrate as microdroplets with a predetermined volume, a two-dimensional probe array having high density is obtained.

(2) As means for applying the probe solutions used in the procedure in paragraph (1) in the form of microdroplets having the predetermined volume on the substrate, a liquid discharging device including reservoirs containing the probe solutions and discharge nozzles connected to the reservoirs is used in which the number of reservoirs and discharge nozzles correspond to the number of plural types of probe. The probe solution is discharged onto the substrate from each nozzle with high reproducibility regarding the discharged volume, and the discharged volumes become uniform in these nozzles. Moreover, this liquid discharging device does not require a step for exchanging the probe solution in the device when many types of probe solution are discharged onto the support, unlike conventional methods. Thus, a washing step for cleaning the liquid discharging device is omitted and contamination of the probe solution does not occur. Accordingly, this liquid discharging device contributes to a simplified production process and improved reliability of the probe support.

(3) The liquid discharging device used can include an array of plural nozzles with sufficiently high density. Thus, the plural types of probe with high purity can be applied onto a two-dimensional array having high arrangement density on the same substrate with high reproducibility and without troublesome operation.

(4) When the plural nozzles suitable for the above use are consolidated in the same liquid discharging device, reservoirs containing probe solutions and discharge nozzles are arranged at predetermined positions in response to the sequence order in the two-dimensional probe array to be formed. Two-dimensional plural probe arrays having the same sequence can be repeatedly produced only by slight alignment for positioning of the overall liquid discharging device without alignment for positioning of individual nozzles.

As means for applying the probe solutions used in the procedure in paragraph (1) in the form of microdroplets having the predetermined volume on the substrate, a liquid discharging device including reservoirs containing the probe solutions and discharge nozzles connected to the reservoirs is used in which the number of reservoirs and discharge nozzles correspond to the number of plural types of probe and the liquid discharging device is preferably formed into a flat chip. The probe solution is discharged onto the substrate from each nozzle with high reproducibility regarding the discharged volume, and the discharged volumes become uniform in these nozzles.

(6) The liquid discharging device used can include an array of plural nozzles with sufficiently high density. Thus, the plural types of probe with high purity can be applied into a two-dimensional high-density array on the same substrate with high reproducibility and without troublesome operation.

The present inventors have completed the invention based on the above knowledge.

According to an aspect of the present invention, a liquid discharging device for making a probe support which has a plurality of types of probe at different positions thereon, comprises reservoirs for containing liquids containing the probes, and discharge nozzles connecting with the corresponding reservoirs, the number of reservoirs and discharge nozzles being at least the number of probes.

Preferably, the probes are nucleic acids or at least parts of nucleic acids. Preferably, the discharge nozzles have opening arranged in a line or in lines and rows. Preferably, the reservoirs are arranged in a position opposite to the discharge direction of the liquids from the discharge nozzles. More preferably, each of the reservoirs communicates with another solution container. Preferably, the liquid discharging device further comprises a thermal energy generator unit for discharging the liquids from the discharge nozzles by thermal energy. More preferably, bubbles formed by thermal energy imparted to the liquids communicate with the environmental atmosphere of the outside of the nozzles to discharge the liquids. Preferably, the liquids are discharged onto the support at the same density as the density of the discharge nozzles of the liquid discharging device. More preferably, the relative movement between the liquid discharging device and the support is repeated several times to discharge the liquids containing the probes so that the density of the discharged liquids is higher than the density of the discharge nozzles of the liquid discharging device.

The present invention also includes an apparatus for making a probe support including the above liquid discharging device. According to another aspect of the present invention, an apparatus for making a probe support which has a plurality of types of probe at different positions thereon includes a liquid discharging device including reservoirs for containing liquids containing the probes and discharge nozzles connecting with the corresponding reservoirs, the number of reservoirs and discharge nozzles being at least the number of probes, and aligning means for aligning the discharge nozzles and the support relatively.

According to another aspect of the present invention, a method for making a probe support which has a plurality of types of probe at different positions thereon comprises the steps of providing a liquid discharging device including reservoirs for containing liquids containing the probes and discharge nozzles connecting with the corresponding reservoirs, the number of reservoirs and discharge nozzles being at least the number of probes, aligning the discharge nozzles and the support relatively, and discharging the liquids containing the probes from the discharge nozzles to different positions on the support.

Preferably, the probes are nucleic acids or at least parts of nucleic acids. Preferably, the discharge nozzles have opening arranged in a line or in lines and rows. Preferably, the reservoirs are arranged in a position opposite to the discharge direction of the liquids from the discharge nozzles. More preferably, each of the reservoirs communicates with another solution container. Preferably, the liquid discharging device further comprises a thermal energy generator unit for discharging the liquids from the discharge nozzles by thermal energy. More preferably, bubbles formed by thermal energy imparted to the liquids communicate with the environmental atmosphere of the outside of the nozzles to discharge the liquids. Preferably, the liquids are discharged onto the support at the same density as the density of the discharge nozzles of the liquid discharging device. More preferably, the relative movement between the liquid discharging device and the support is repeated several times to discharge the liquids containing the probes so that the density of the discharged liquids is higher than the density of the discharge nozzles of the liquid discharging device.

The present invention also includes combinations thereof.

In this specification, a probe support in which probes are arranged into an array is referred to as a "probe array".

According to another aspect of the present invention, a method for making a probe array in which a plurality of types of probe is fixed as a two-dimensional array on a solid-phase substrate, comprises the steps of discharging probe liquids, each solution containing each of the probes, as droplets having a predetermined volume from respective reservoirs of a liquid discharging device through respective discharge nozzles connected to the corresponding reservoirs on the solid-phase substrate to apply the probe liquids in the form of a two-dimensional array, and fixing the probes contained in the probe liquids on the solid-phase substrate, wherein the number of reservoir and the discharge nozzles corresponds to the number of types of probe. In this method, preferably, the discharge nozzles of the liquid discharging device are one-dimensionally or two-dimensionally arranged. More preferably, one-dimensionally or two-dimensionally arranged discharge nozzles are consolidated.

Preferably, the probe liquids are discharged from the nozzles in the Z direction of the liquid discharging device, and the reservoirs are fabricated on a side of the liquid discharging device and the nozzles are fabricated on the opposite side of the liquid discharging device. For example, the nozzles arranged in the array is integrally formed on one face of the substrate for lithography, and the corresponding reservoirs are integrally formed on the other face of the substrate.

Moreover, the liquid discharging device may be provided with supplementary reservoirs connected to the integrated reservoirs, if necessary. Preferably, the supplementary reservoirs are arranged into an array so as to overlap the nozzle array Alternatively, a liquid discharging device having a two-dimensional nozzle array block may be used in which the nozzle array block comprises a plurality of one-dimensional nozzle array block units.

The inkjet head of the liquid discharging device may be of a piezoelectric type or a thermal jet type using heating elements. The thermal jet type is more suitable for the formation of a high-density nozzle array on one inkjet head.

Preferably, the liquid discharging device has 100 or more sets of the reservoirs and the nozzles to discharge many types of probe. The number of the sets of the reservoirs and the nozzles is preferably 1,000 or more, more preferably 10,000 or more, and most preferably 100,000.

In the use of such an inkjet head having many nozzles, the areal density of the nozzles is preferably equal to the probe array density in view of the above-described discharge position. For example, using an inkjet head having a nozzle density of $100/cm^2$ or more, $1,000/cm^2$ or more, $10,000/cm^2$ or more, or $100,000/cm^2$ or more, probe liquids can be discharged to form a probe array with high array density without positioning individual nozzles. Whether or not the liquid discharging device is provided with the supplementary reservoirs is determined by the required volume of the probe solution, the structure of the inkjet head, and the method for supplying the probe solution to the reservoir, Also, a probe array having a desired density may be prepared using an inkjet head having nozzles with an array density which is lower than the probe array density. In this case, the time interval and the pattern of discharge are adjusted according to the density and the pattern of the probe array.

According to an aspect of the present invention, an apparatus for making a probe array having a plurality of types of probe which is two-dimensionally fixed on a solid-phase substrate, the apparatus comprising:

a liquid discharging device including reservoirs for containing liquids containing the probes and discharge nozzles connecting with the corresponding reservoirs, the number of reservoirs and discharge nozzles corresponding to the number of probes, the liquid discharging device applies the liquids containing the probes onto the solid-phase substrate to form a two-dimensional probe array.

The liquid discharging device and the apparatus for making the probe array of the present invention are used to make the probe array according to the method for making the probe array of the present invention. Thus, the liquid discharging device and the apparatus for making the probe array are preferably characterized by the above-described configurations.

According to another aspect of the present invention, a method for making a probe array in which a two-dimensional array of a plurality of types of probe is fixed on a solid-phase substrate, the method comprises the steps of:

supplying liquids of the plurality of types of probe from reservoirs to corresponding nozzles and discharging the liquids from relevant nozzles required for the formation of the two-dimensional probe array on the solid-phase substrate to form a spotting region of probe liquids, using a liquid discharging device provided with a plurality of liquid discharge sections, each having the reservoir for containing the solution, the nozzle for discharging the solution, and discharge energy generating means for discharging the solution from the nozzle; and fixing the probes contained in the liquids applied in the spotting region on the solid-phase substrate.

In this method, the plurality of nozzles in this liquid discharging device are preferably arranged into a two-dimensional array.

In the liquid discharging device, the direction of discharge of the liquids from the nozzles may be perpendicular to the plane defined by the nozzles, and the reservoirs are formed on the side opposite to the side provided with the nozzles so as to correspond to the nozzles.

In this case, the liquid discharging device may be formed by combining a plate including an array of supplementary reservoirs connected to the reservoirs, the plate being bonded to the rear face of the substrate provided with the reservoirs which is arranged to correspond to the two-dimensional nozzle array so that the reservoirs and the corresponding supplemental reservoirs are connected to each other.

The liquid discharging device is preferably of a thermal jet type in which liquids are discharged with heating elements.

The heating element preferably is composed of a heater, a lead of aluminum or the like for applying a voltage to the heater, and a pad for connecting the liquid discharging device to the exterior. Preferably, this liquid discharging device is provided with the above-described additional configurations.

The volume of the probe solution to be applied is determined based on the areal density of the probe array to be prepared. The volume of the probe solution discharged from the nozzle is preferably in the range of 0.1 picoliter to 100 picoliters. The spotting area on the substrate may be appropriately determined by the applied volume of the solution. The spotting area in the two-dimensional probe array formed on the solid-phase substrate is preferably in the range of 0.01 $\mu m^2$ (for example, 0.1 $\mu m \times 0.1$ $\mu m$) to 40,000 $\mu m^2$ (for example, 200 $\mu m \times 200$ $\mu m$).

The probe fixed on the solid-phase substrate is a molecule called a ligand which can identify a specific target. The probe may be oligonucleotide, polynucleotide, or a polymer which can identify a specific target. In the present invention, the term "probe" represents both a molecule having a probing function, such as individual polynucleotide, and a group of molecules having the same probing function, such as polynucleotide having the same sequence which is fixed at a position on the surface, depending on the context. The probe and the target may be mutually exchangeably used. The probe can bond or can get to bond to a target as a part of a pair of ligand-antiligand. The probes and targets in the present invention include nucleic acids found in nature and analogs thereof.

An example of the probes supported on the solid-phase substrate is an oligonucleotide having a base sequence which allows hybridization with a target nucleic acid. The oligonucleotide is bonded to the solid-phase substrate via linker. That is, the probe is bonded to a predetermined position on the surface of the solid-phase substrate. The bond to the solid-phase substrate may be at any position in the nucleotide molecule as long as the hybridization reaction occurs.

The probes used in the probe array of the present invention can be appropriately selected, according to the purpose. In a preferred embodiment, the probe is preferably at least one selected from the group consisting of DNAs, RNAs, complimentary DNAs (cDNAs), PNAs, oligonucleotides, polynucleotides, other nucleic acids, oligopeptides, polypeptides, proteins, enzymes, substrates to enzymes, antibodies, epitopes to antibodies, antigens, hormones, hormone receptors, ligands, ligand receptors, oligosaccharides, and polysaccharides.

Preferably, the probe array according to the present invention contains a probe having a structure which can bond to the surface of the solid-phase substrate. The fixation of the probe to the surface of the solid-phase substrate is preferably by such bonding.

Examples of the structures which can bond to the surface of the solid-phase substrate include an amino group, a mercapto group, a carboxyl group, a hydroxyl group, acid halides (—COX), halides (—X), aziridine, maleimides, succinimides, isothiocyanates, sulfonyl chlorides (—SO$_2$Cl), aldehydes (formyl groups: —CHO), hydrazines, and iodoacetoamides. On the other hand, another organic functional group which can react with any one of the above organic functional groups is preliminarily introduced onto the substrate surface.

In the method for making the probe array of the present invention, a plurality of liquids containing different probes which are preliminarily synthesized, purified, and identified is discharged in a predetermined volume onto a substrate to form a probe array using a liquid discharging device having reservoirs for containing the probe liquids and nozzles connected to the reservoirs, the number of the reservoirs and nozzles corresponding to the number of the probes. The probe contents in the probe dots formed on the substrate are highly uniform and reproducible over a plurality of substrates.

When an array liquid discharging device is used, an inkjet head thereof has a shape including reservoirs and nozzles which are integrated with high density. By reducing the nozzle size, the volume of the discharged solution is reduced. Thus, dots having high array density can be effectively formed on the substrate by parallel discharge.

According to the present invention, the formation of a unit chip with a high-density array in the liquid discharging device facilitates the formation of a two-dimensional probe array containing many types of probe, the formation of high-density dots, and a decreased area of each dot on a solid-phase substrate.

Further objects, features and advantages of the present invention will become apparent from the following description of the preferred embodiments( with reference to the attached drawings).

BRIEF DESCRIPTION OF THE DRAWINGS

FIGS. 6A to 6D illustrate an etching process for forming a ZBJ nozzle.

FIG. 7 is a schematic view of an arrangement of heating elements in a ZBJ substrate.

FIG. 8 is a schematic view of another arrangement of heating elements in the ZBJ substrate.

FIGS. 22A to 22D are cross-sectional views illustrating discharge of ink from a nozzle of a ZBJ chip.

FIG. 23 illustrates conduction of heat generated in a heating element in a ZBJ chip.

FIG. 24 illustrates conduction of heat generated in a heating element in a ZBJ chip.

FIG. 34 is a cross-sectional view taken along line XXXIV-XXXIV in FIG. 32.

FIG. 35 is a schematic view of the back face of the semiconductor chip constituting the thermal-jet liquid discharging device shown in FIG. 31

FIG. 43 is a plan view of a nozzle face of a liquid discharging device.

DESCRIPTION OF THE PREFERRED EMBODIMENTS

The preferred embodiments of the present invention will now be described with reference to the drawings.

(1) Embodiments Using Liquid Discharging Device

In the first embodiment of a method for making a probe array according to the present invention, a two-dimensional probe array having a predetermined sequence is formed on a substrate surface by discharging required amounts of probe solutions, which are preliminarily prepared, from an array of discharge nozzles of a liquid discharging device. This method facilitates a high density array arrangement for various types of probe.

An inkjet head having an array structure which is used in the discharge/spotting step of the probe solutions will now be described.

A method for discharging solutions by an inkjet process has originally been developed for inkjet printing. Among the solutions used are typically a black ink for monochrome (generally black) printing, and three primary color inks, i.e., yellow (Y), cyan (C), and magenta (M) for color printing. Some color printing processes use concentrated and diluted black ink or Y, M, and C inks, if necessary; at most ten types of ink are generally used.

A typical conventional inkjet head block used in inkjet printing is provided with reservoirs for containing sufficient amounts of inks, channels, and nozzles, channels conducting the respective ink to the nozzles. Although these inks are applied to a wide area by printing, each dot size is designed to be small in order to achieve high-resolution printing. Thus, the head block is provided with a plurality of nozzles, for example, 64, 128, or 256 nozzles, for each color in order to maintain a desired printing rate. That is, each color ink is discharged from a plurality of nozzles via the corresponding reservoir and channel.

The structure of the inkjet head will now be described in further detail according to a thermal jet process which is one type of inkjet process. The structure of this inkjet head is described in detail in Japanese Laid-Open Patent No. 06-040037, and the inkjet head having such a structure and an electrical control circuit for driving the head can be prepared with reference to the description of this document.

Figure 1:
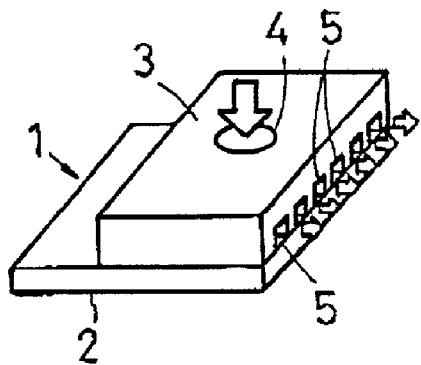
FIG. 1 is an isometric view of a bubble-jet print head having a separated two-component structure.
Figure 2:
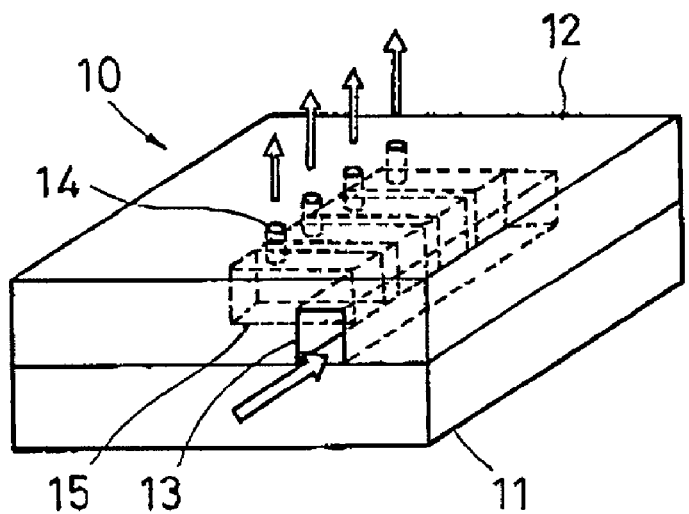
FIG. 2 is an isometric view of another bubble-jet print head having a separated two-component structure.

FIGS. 1 and 2 are isometric views of typical inkjet heads of the thermal jet type (so-called bubble jet (BJ) type) made by Canon Kabusiki Kaisha and Hewlett-Packard Company, respectively. With reference to FIG. 1, the conventional BJ head 1 is formed of a BJ semiconductor chip device 2 in contact with a cap 3 which is laser-etched. The cap 3 acts as a guide which generates an internal flow (indicated by the arrow in the drawing) of ink from an inlet 4 to the head 1 and external jet flows from a plurality of nozzles 5 in the head 1.

These nozzles 5 are formed on the bottom of the cap 3 in the form of open channels Heating elements (not shown in the drawing) are arranged on the BJ semiconductor chip device 2. The number of heating elements is determined according to the number of nozzles. For example, 74 heating elements may be provided. When a heating element is energized, a bubble is formed in the ink by thermal evaporation of the solvent in the ink in the corresponding channel. The increase in volume due to bubbling results in ink discharge through the corresponding nozzles 5.

The BJ semiconductor chip device 2 has a semiconductor diode matrix (not shown in the drawing) which has a function of supplying energy to the heating element adjoining the channel.

With reference to FIG. 2, in a thermal jet head 10 made by Hewlett-Packard Company, ink is introduced into a cap 12 through an inlet 13 provided at a side face of the cap 12 and then into an array of nozzles 14 on the upper face of the cap 12 which are provided in series from the inlet 13. The ink is discharged from the nozzles by heat which is generated in flat heaters 15 provided under the nozzles 14.

These inkjet heads shown in FIGS. 1 and 2 are designed to be used with most 10 types of ink. Thus, without modification, these inkjet heads are not suitable for production of a probe array which requires 100 or more types of probe. A possible method for the production of the probe array is use of a plurality of such inkjet heads. Probe solutions are applied to parts of the array using these inkjet heads and this operation is repeated until the entire array is formed. This method however involves a troublesome head exchange operation followed by fine alignment of each head.

Although these conventional inkjet printer heads are provided for printing and have many nozzles for one ink, such a configuration is not necessary for making a probe array. Furthermore, each conventional head has a two-component structure including the cap component and the ink channel component because a large reservoir for each color ink is provided at the cap portion having the plurality of nozzles. In addition, the inlet direction and the outlet direction of the ink are orthogonal to each other, as shown in FIGS. 1 and 2. Such a configuration precludes providing a large number of ink channels. Accordingly, these two-component-type inkjet heads for color printing are unsuitable for making a probe array without modification.

Japanese Laid-Open Patent No. 06-040037 discloses an integrated BJ head which is used as a substitute for the two-component inkjet heads. This integrated BJ head is referred to as a Z-axis BJ (hereinafter ZBJ) head in which the nozzle section and the reservoir section are integrated. However, this structure is also suited for printing: in other words, several nozzles are provided for one type of ink. In contrast, in the present invention, the liquid discharging device includes reservoirs containing different probe solutions and discharge nozzles which are connected to the respective reservoirs. Since probe solutions discharged from these nozzles to the solid-phase substrate contain different probes, a two-dimensional probe array can be readily formed on the substrate.

As described above, the integrated BJ head according to the present invention includes the reservoirs containing the probe solutions and the discharge nozzles connected to the respective reservoirs. Such an integrated BJ head can be formed by a designing and manufacturing process described in Japanese Laid-Open Patent No. 06-040037.

Hereinafter, the term "Z-axis bubble jet chip (ZBJ chip)" is used to illustrate a bubble jet chip which lies in the XY plain and has nozzles for the Z direction discharging. The structure of this liquid discharging device will now be described based on the operation when aqueous color inks are used instead of the probe solutions, with the aim of facilitating comprehension.

Figure 3:
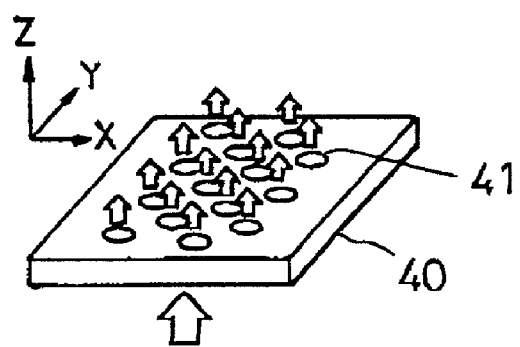
FIG. 3 is an isometric view of an integrated ZBJ chip.

FIG. 3 shows an outline shape of a ZBJ chip 40. The ZBJ chip 40 is a plate which has an ink inlet provided at the bottom face thereof and a plurality of nozzles 41 for discharging the ink at the upper face thereof. The bubble jet chips shown in FIGS. 1 and 2 have two-component structures, whereas the ZBJ chip 40 shown in FIG. 3 has a monolithic structure Such a ZBJ chip 40 can be made by semiconductor fabrication techniques. In this configuration, the flow of the ink introduced into the chip 40 and the flow of the ink discharged from the nozzles 41 are in the same direction.

Figure 4:
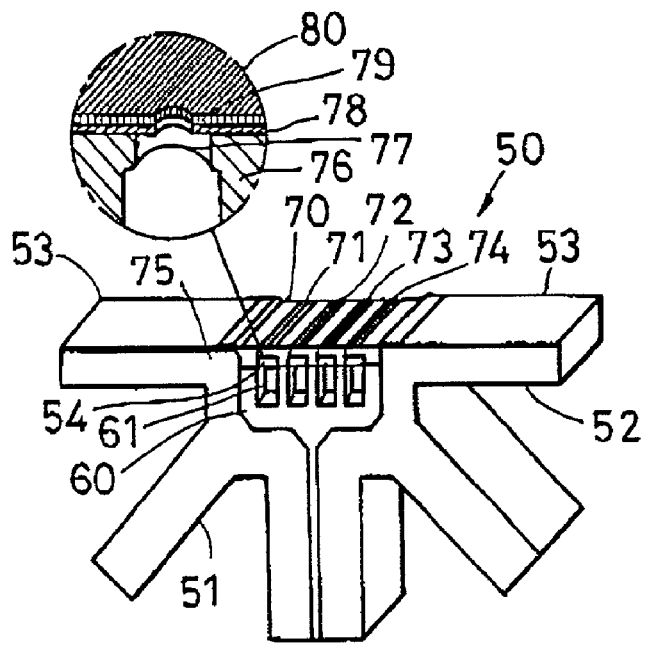
FIG. 4 is an isometric view of a first embodiment of a ZBJ head.

FIG. 4 is an isometric view of an exemplary stationary (unmoving) ZBJ print head 50 which can print a continuous greyscale image with an image density of 1,600 dpi (dots per inch) or 400 pixels per inch over a length corresponding to the length of an A4 sheet. The head 50 is provided with one ZBJ chip 70 including four nozzle arrays 71, 72, 73, and 74, each having a nozzle 77.

The four nozzle arrays 71, 72, 73, and 74 constitute one pixel. The chip 70 includes, for example, 51,200 nozzles. The enlarged view in FIG. 4 illustrates a basic nozzle cross-section formed in a silicon substrate 76 which is provided with a thermal silicon dioxide ($SiO_2$) layer 78 thereon. A heating element 79 is provided around the nozzle 77 and is covered with a glass overcoat layer 80 deposited by a chemical vapor deposition (CVD) process. The ZBJ chip 70 is arranged on a channel protuberance 60 which has ink channels 61 connecting with a common ink path 75 for inks of specific colors so as to continuously supply inks to the chip 70. A membrane filter 54 is disposed between the channel protuberance 60 and the chip 70.

The chip 70 is electrically connected to two busbars 51 which supply electrical power and function as heatsinks for dissipating the heat from the chip 70.

Figure 5:
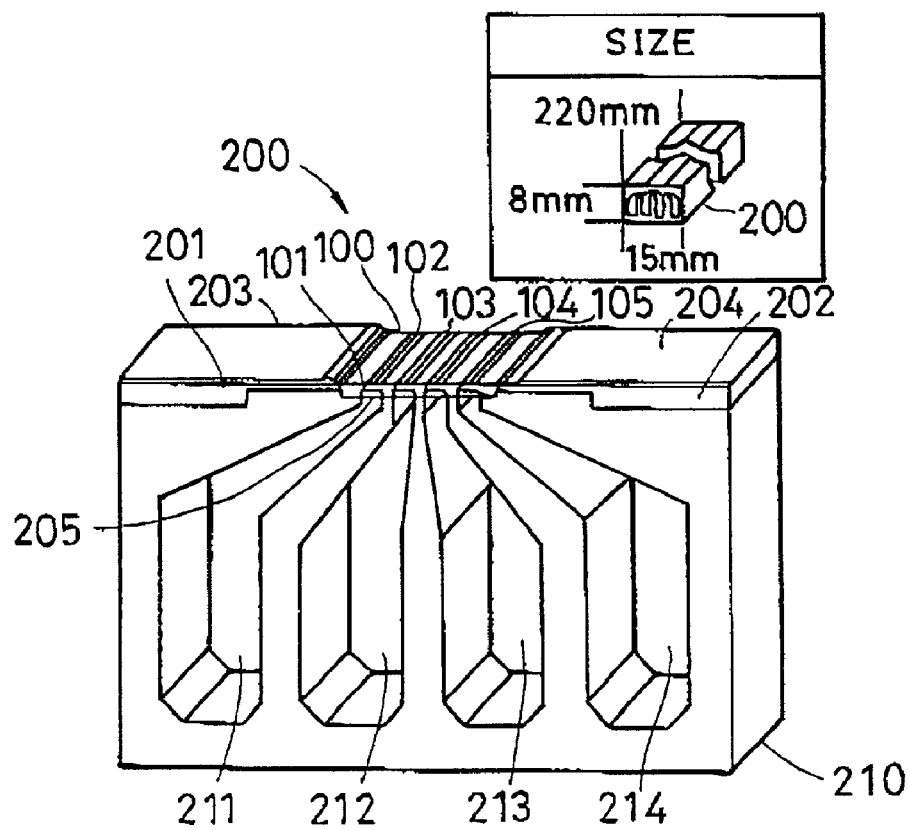
FIG. 5 is an isometric view of a second embodiment of the ZBJ head.

FIG. 5 shows a ZBJ head 200 as another embodiment of the present invention. This ZBJ head 200 has a ZBJ chip 100 including nozzle arrays 102, 103, 104, and 105. The chip 101 has ink channels 101 in a channel protuberance 210 which communicate with ink reservoirs 211, 212, 213, and 214 for color inks.

The channel protuberance 210 has relatively a large volume with respect to the size of chip 100 compared with the chip 50 shown in FIG. 4. Busbars 201 and 202 are connected to the chip 100 with tab connectors 203 and 204. A membrane filter 205 is also provided as in FIG. 4. When printing is performed on an A4 sheet, the head 200 must have a length of about 220 mm, a width of about 15 mm, and a depth of about 9 mm. The ZBJ head may be modified in any way within the above basic configuration. The size of the chip and the number of nozzles depend on the performance required for the printer.

The structure of the ZBJ chip 100 will now be described in more detail. As shown in FIG. 5 and FIGS. 6A to 6D, the ZBJ chip 100 has, for example, four nozzle arrays 102 to 105 which are provided with four nozzle paths 110. These nozzle paths 110 are formed by etching so as to pass through the substrate 130 of the chip 100. Generally, the substrate 130 has a thickness of 500 µm. Moreover, the substrate 130 has, for example, a width of 4 mm and a length of 220 mm according to the required applications. FIGS. 6A to 6D show the formation of the nozzle path 110 in the substrate 130 by etching. In order to discharge 3 picoliters of liquid from the ZBJ chip 100, the diameter of each nozzle 110 must be about 20 µm. The substrate 130 has a depth of 500 µm. The substrate 130 is provided with a heater 120 and a glass ($SiO_2$) overcoat layer 142 covering the heater 120. With reference to FIG. 6A, one possible method for making the nozzle path 110, a 20-µm straight-walled circular hole and at least 10 µm into the substrate 130 is formed so as to path through the glass overcoat layer 142. A nozzle tip 111 is thereby formed.

With reference to FIG. 6B, a nozzle channel 114 with a width of about 100 µm and a depth of 300 µm is formed by etching from the rear side of the ZBJ chip 100. With reference to FIG. 6C, a nozzle barrel 113 with a thickness of about 40 µm is formed from the bottom of the nozzle channel 114 to the front side of the ZBJ chip 100 by isotropic plasma etching. Since the isotropic plasma etching is relatively nonselective, the heater 120 will be damaged if the vicinity of the entire front side is etched.

With reference to FIG. 6D, the entirely exposed silicon in the region 10 µm from the front side is subjected to isotropic etching from the front side. The nozzle 110 is enlarged and the $SiO_2$ layer 142 is undercut. As a result of this etching step, the nozzle tip 111 is connected to the barrel 113 without damaging the heater 120. The above-described size of each portion can, of course, be modified according to the application of the head 100. However, the front to back surface etching should be aligned to better than 10 µm and the etch depth control should also be better than 10 µm. In this manner, the nozzle path 110 including the tip 111, the cavity 112, the barrel 113, and the channel 114 is formed. The nozzle tip 111, the cavity 112 functioning as a thermal chamber, the barrel 113, and the channel 114 form an ink path.

For example, an integrated bubble jet head produced by Canon Kabusiki Kaisha includes a heating element composed of hafnium boride ($HfB_2$). In a current printer (Canon type BJ10), the heater parameters are set based on a liquid discharge volume of 65 picoliters. If this printer is adapted to a discharge volume of 3 picoliters, the structure of the heater must be modified. Preferably, the heater 120 has a gear-like structure shown in FIG. 7 to achieve a required heater resistance and to minimize the overall heater size. The heater 120 includes a main heating element 121 and a redundant heating element 122 which surround the nozzle tip 111, unlike single-heater structures in conventional BJ chips. The redundant heating element 122 is provided to enhance fault tolerance and the yield of the ZBJ chip 100 during manufacturing.

FIG. 8 is an enlarged cross-sectional view of the nozzle path 110 shown in FIGS. 6A to 6D. In particular, the relative dimensions of the heater 120 and the nozzle tip 111 can be assessed.

Figure 9:
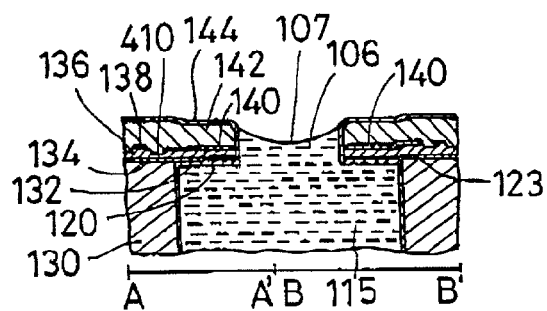
FIG. 9 is a schematic view of another arrangement of heating elements in the ZBJ substrate.

FIG. 9 is a cross-sectional view of the thermal chamber taken along line IX-IX' in FIG. 7. The substrate 130 as an underlayer is a processed wafer having a thickness of about 200 μm which is prepared by back etching an original wafer having a thickness of 500 μm followed by a high-temperature treatment. The substrate 130 has ink paths. The substrate 130 also functions as a thermal conduction path, and is used as a semiconductor substrate for a drive circuit connected to the heater 120.

A heat insulating layer 132 is an $SiO_2$ layer which is formed by thermal oxidation and has a thickness of 0.5 μm. The heat insulating layer 132 has several functions, namely, insulating the heater 120 from an upper passivation layer 144, relieving the heater 120 from mechanical stress due to bubbling force, and functioning as an integrated portion of a MOS drive circuit (described below).

It is preferred that the heat insulating layer 132 be as thin as possible to facilitate thermal conduction from the heater 120 to ink 106. The $SiO_2$ formed by thermal oxidation has no pinholes. Thus, the thickness of the heat insulating layer 132 can be smaller than that of any conventional bubble jet head including a CVD $SiO_2$ layer.

The heater 120 has a thickness of 0.05 μm and is composed of hafnium boride ($HfB_2$) or a boride of Group IIIA to Group VIA metal. The heater 120 transduces electrical drive pulses into heating pulses. Hafnium boride has a high melting point of 3,100° C. and is suitable for heaters. The heater 120 is connected to a drive circuit by an aluminum connection 123 with a thickness of 0.5 μm which constitutes a part of an aluminum first metal layer 134 having a thickness of 0.5 μm. The first metal layer 134 and the connection 123 may be formed by the same process. The first metal layer 134 is also used for connection in the drive circuit. Because the color ZBJ head described in this specification requires mutual connection between thin lines with high density and high quality, the head must include many nozzles in a small area. Thus, the an interconnection size of about 2 μm is required.

An insulating interlayer 136 composed of $SiO_2$ is formed by CVD or photon enhanced (PE) CVD and has a thickness of about 1 μm. The thickness of the insulating interlayer 136 significantly affects the operation of the ZBJ chip 100 because this thickness causes a thermal difference between the heater 120 and a heat shunt 140. Such a thermal difference ensures thermal conduction to the ink 106 rather than to the underlying substrate 130. The insulating interlayer 136 also ensures electrical insulation between the first metal layer 134 and a second metal layer 138.

The second metal layer 138 is provided to secure electrical connection as in the heat shunt 140. Because the high-speed ZBJ head with 250 nozzle/mm has a high interconnection density, two metal layers are required for the 2-μm design rule. One metal layer is also allowable in some head designs. When one metal layer is used, the heat shunt 140 must have another configuration because this metal layer is formed over the insulating interlayer 136.

The heat shunt 140 is an aluminum disk having a thickness of about 0.5 μm. This heat shunt 140 is thermally connected to the underlying substrate 130 via a via hole (not shown in the drawing) in the heat insulating layer 132 and the insulating interlayer 136, but does not function as an electrical conductor. The heat shunt 140 conducts the heat generated in the heater 120 to the underlying substrate 130 at a controlled rate. In order to maintain the temperature of the ink 106 in an nonoperational mode, the heat must be dissipated during a heater drive pulse.

When these layers have the same thickness, the heat shunt 140 and the second metal layer 138 can be formed by the same process. The thickness thereof depends on the thermal connection between the heat shunt 140 and the heater 120. Preferably, the amount of the thermal connection is determined by a precise computer model of a nozzle which has a specific geometric shape. The heat shunt 140 also prevents heating of the thick glass overcoat layer 142. The thick heat shunt 140 delays diffusion of CVD carrier gas and thus the formation of bubbles which may damage the heater 120.

The overcoat layer 142 is generally formed by CVD or PECVD and has the following three functions: providing nozzles to discharge inks; imparting mechanical strength against the impact caused by bubbling and debubbling; and protecting the ZBJ chip 110 from the environment. Since the ZBJ chip 110 is exposed to the atmosphere during the printing process, the surface thereof must be more securely protected compared with sealed components. Generally, the thickness of the overcoat layer 142 is about 4 μm and may be increased according to the length of the nozzle.

The passivation layer 144 is composed of tantalum or the like and has a thickness of about 0.5 μm. The passivation layer 144 covers the entire ZBJ chip 100 to chemically and mechanically protect it.

Also, the ink 106 contributes to exhaust heat transfer. For example, 3 picoliters of liquid removes a heat of about 13 nJ/° C.

Figure 10:
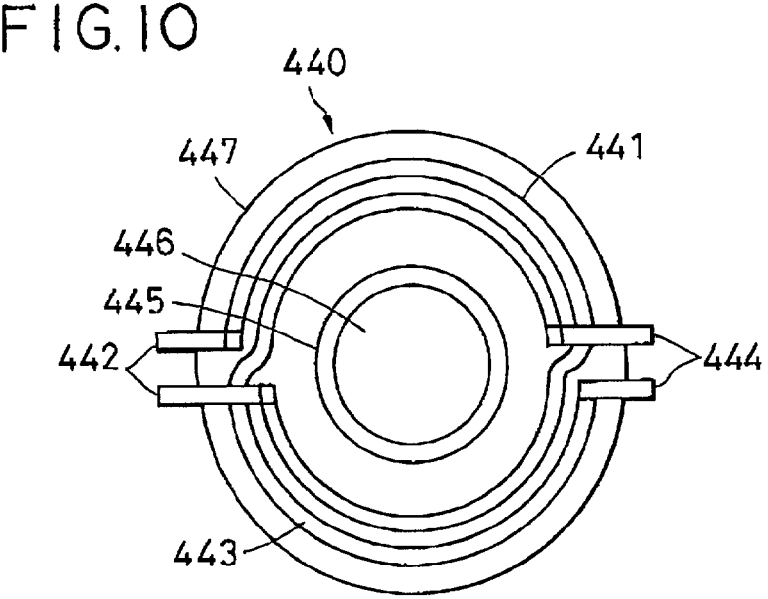
FIG. 10 is a schematic view of a heater configuration in the heating element in the ZBJ substrate.

FIG. 10 shows another exemplary heater 440. The heater 440 has a main heater component 441 and a redundant heater component 443 which surround a nozzle 445 discharging an ink drop 446. The main heater component 441 and redundant heater component 443 are formed by deposition of $HfB_2$ and overlap with aluminum connections 442 and 443, respectively. The heater 440 surrounds an underlying thermal cavity 447 so as to form an annular ink bubble (see FIGS. 21A to 21D and 22A to 22D). The bubble generates a substantially isotropic pressure at the perimeter of the ink drop 446. The main heater component 441 and the redundant heater component 443 have the same shape and arrangement, and thus have the same liquid discharge characteristics. Since eccentricity of the main heater component 441 and the redundant heater component 443 with respect to the nozzle 445 is slight, the discharge angle of the liquid will not substantially change if the redundant heater component 443 is used when the main heater component 441 is damaged.

As described above, a nozzle shown in FIG. 9 has a cylindrical cavity, a slit tip, and a nozzle for forming a cavity as a thermal chamber at the bottom portion. A variety of nozzle shapes are available. Some of them are shown in FIGS. 11 to 20.

Figure 11:
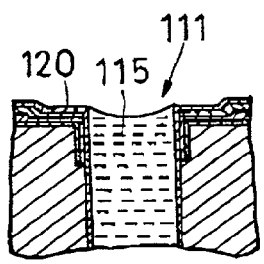
FIG. 11 is a cross-sectional view of an example of the nozzle shape of a ZBJ head.

With reference to FIG. 11, a thermal chamber 115 surrounding a nozzle tip 111 is circular and the heater 120 is deposited on the cylindrical wall. This configuration, however, has the following disadvantages;
(1) Since the film heater 120 must be deposited on the vertical cylindrical wall by CVD, it is extremely difficult to control the shape and the size thereof;
(2) It is difficult to form a redundant heater component to cover a main heater component as described below;
(3) The heater 120 is provided on the cylindrical wall only in order to discharge ink 106 and vapor thereof from a tip 111; and
(4) CVD $SiO_2$ must be used instead of crystalline $SiO_2$ having high thermal conductivity to separate the ink from the heater 120.

Figure 12:
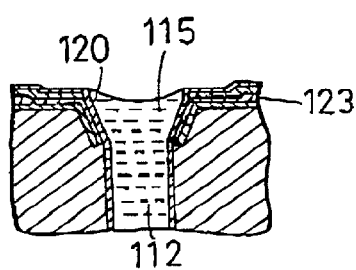
FIG. 12 is a cross-sectional view of another example of the nozzle shape of the ZBJ head.

With reference to FIG. 12, the thermal chamber 115 is frustoconical. This configuration increases the resistance of the heater 120 by etching, but has the following disadvantages:
(1) When the cone has a high inclination (flat), the nozzle 110 will now be filled with the ink 106 due to a capillary phenomenon;
(2) When the cone has a low inclination (sharp), it is difficult to fabricate the heater 120, like the above cylindrical thermal chamber; and
(3) Since the nozzle barrel 123 is significantly small, much time is required for refilling the ink.

Figure 13:
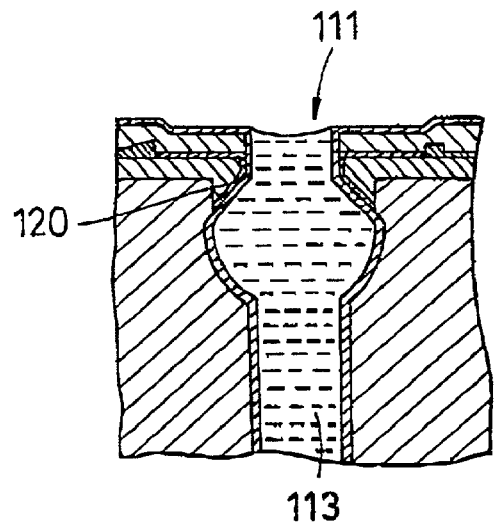
FIG. 13 is a cross-sectional view of another example of the nozzle shape of the ZBJ head.

With reference to FIG. 13, the nozzle has a chamber including a substantially semispherical bottom portion and a frustoconical upper portion which is provided with a heater 120.

Figure 14:
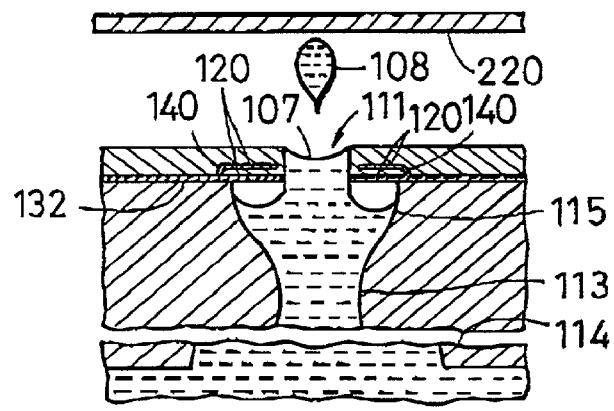
FIG. 14 is a cross-sectional view of another example of the nozzle shape of the ZBJ head.
Figure 15:
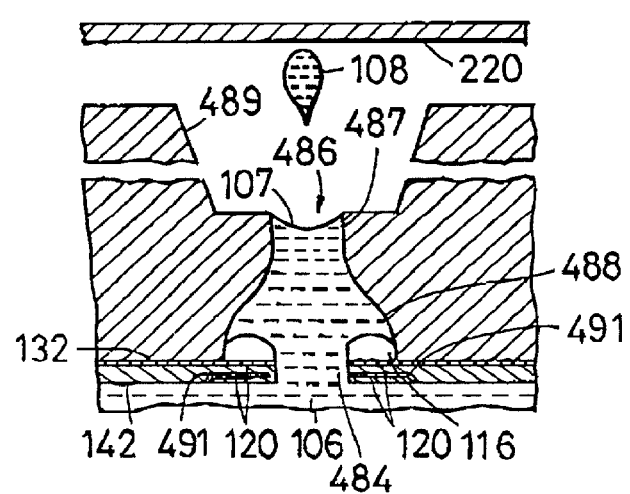
FIG. 15 is a cross-sectional view of another example of the nozzle shape of the ZBJ head.
Figure 16:
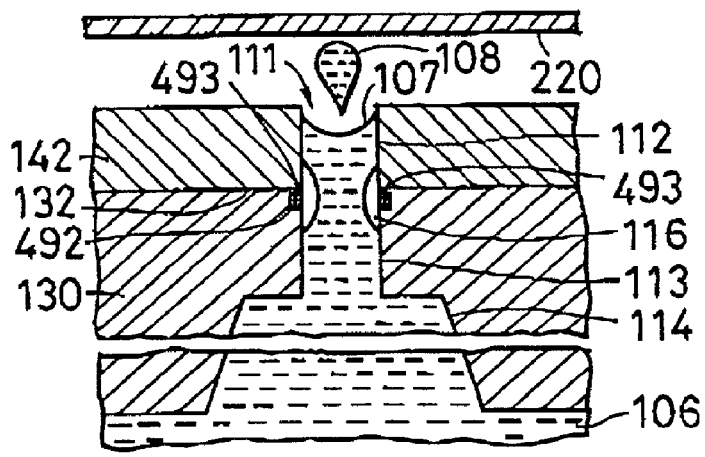
FIG. 16 is a cross-sectional view of another example of the nozzle shape of the ZBJ head.

FIGS. 14 to 16 show preferred integrated nozzle configurations which can form a droplet of 3 picoliters allowing a resolution of 1,600 dpi, have a fault tolerant heater structure, and can be used for color printing on a substrate surface with a predetermined pitch.

With reference to FIG. 14, the thermal chamber 115 is substantially hemispherical. The thermal chamber 115 is formed by isotropically etching away the lower portion of silicon before the nozzle barrel 113 is formed by reactive ion etching. This configuration is characterized by a counteraction wherein the direction of the formation of a bubble 116 is opposite to the direction of the discharge of an ink drop 108. The heat shunt 140 conducts heat from the nozzle region to the substrate 130 to shorten the time which is required for sufficiently cooling the thermal chamber 115 before discharge.

Since this configuration allows a flat heater structure, the shape and size of the heater can be precisely controlled. Thermal coupling between the heater 120 and the ink 106 is important because the heater 120 is isolated from the ink 106 by a $SiO_2$ layer 132 having higher thermal conductivity than that of CVD glass. Compared with a layer formed of CVD glass, the thickness of this layer can be reduced without increasing the possibility of forming pinholes. This nozzle configuration allows automatic ink feeding by the capillary effect which depends on the inclination of the barrel 113 to the thermal chamber 115 and the contact angle between the passivation layer 144 (see FIG. 9) and the ink.

An disadvantage of this configuration is the above-described counteraction. Moreover, this configuration requires a thick CVD glass enveloping layer to form the nozzle region. In addition, the exhaust heat must be dissipated via a long path of about 600 μm over the entire silicon substrate 130. Thus, the nozzle density and/or the discharge frequency is limited.

This configuration has another latent disadvantage in that it is difficult to fill the nozzle 110 with the ink 106 by the capillary effect if the angle of the barrel 113 to the thermal chamber 115 is not strictly determined.

The nozzle configuration shown in FIG. 15 is substantially the same as that shown in FIG. 14, but has a reverse nozzle configuration in which the ink 106 flows in the chip 100 in the opposite direction to that in FIG. 14. That is, the direction of the formation of the bubble and the direction of the discharge of the ink droplet are the same. The ink 106 enters the nozzle channel through an opening 484 to form a meniscus 107 at a nozzle tip 486 which lies at the boundary between a barrel 487 and a channel 489. The bubble 116 that is formed discharges the ink drop 108 onto a medium 220 such as paper through the channel 489.

The reverse nozzle configuration 485 significantly differs from the former configurations, and each of which uses the heat shunt 140 to conduct heat from the heater 140 to the substrate 130, as shown in, for example, FIG. 14.

In contrast, the configuration shown in FIG. 15 includes an ink reservoir in the vicinity of the heater 120. Thus, a heat diffuser 491 increases the heat transport area from the heater 120 to the ink reservoir through an enveloping layer 142. This configuration considerably decreases the heat conduction path and facilitates heat diffusion compared with that in FIG. 14. The use of an ink feeding pump (not shown in the drawing) which promotes refluxing of the ink 106 in the thermal exchanger will further enhance heat diffusion.

This simple planar structure exhibits excellent thermal coupling and heat diffusion. Since the bubbles are formed in the same direction as that of the discharge of the ink, the ink can be discharged without significant kinetic energy loss. This configuration has a disadvantage in that the ink cannot be spontaneously supplied into the nozzle. In other words, the ink must be supplied under pressure at the initial stage. After the ink is supplied, the ink droplet 108 is discharged, and then supplemental ink is spontaneously introduced into a thermal chamber 488 as a result of the shrinkage of the bubble. As another disadvantage, a cantilever supporting the heater 120 must have a sufficient thickness so that the heater 120 withstands an impact when the bubble 116 disappears.

With reference to FIG. 16, this nozzle configuration has a heater 493 implanted in a trench. A nozzle cavity 112 is cylindrical and communicates with a nozzle barrel 113 and a nozzle channel 114 which is optionally formed by etching so as to have a desired shape. A circular groove 492 is formed on the silicon substrate by etching, and an $SiO_2$ layer is formed in the vicinity of the nozzle cavity 112. The heater 493 forms a bubble 116 in the ink, and the bubble 116 grows across the cavity 112. Advantages of this configuration are excellent thermal coupling and spontaneous ink supply. A disadvantage of this configuration is reduced heat diffusion. Since the major part of the ink, which is 600 μm from the bubble forming surface, is isolated from the bubble forming surface by the substrate 130, cooling of the ink by heat diffusion is not effective. The length of the nozzle is determined by an extremely thick CVD glass layer which forms an envelope layer 142, and the resulting length is not ideal. Since the bubble grows in the perpendicular direction, the bubbling does not cause a force which is suitable for ink discharge. Since the length of the heater 493 is limited to half of the periphery when a fault tolerant configuration is used, it is difficult to increase the resistance of the heater 493.

Figure 17:
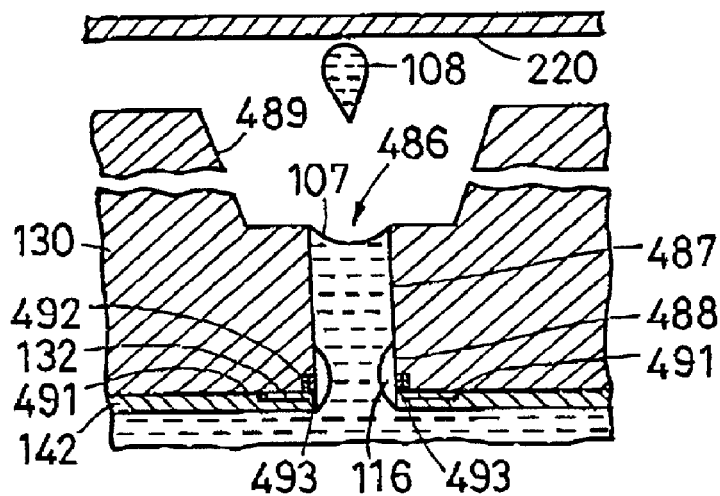
FIG. 17 is a cross-sectional view of another example of the nozzle shape of the ZBJ head.

FIG. 17 shows a nozzle configuration which is a combination of the above reverse nozzle configuration and the circular groove configuration shown in FIG. 16. The circular groove 492 and the heater 493 which is formed in the circular groove 492 by diffusion extend towards the nozzle tip 486. A heat diffuser 491 is also provided. This configuration has some advantages, namely, excellent thermal coupling and heat diffusion, easy spontaneous ink supply, and easy head production. The disadvantages of this configuration are that the bubbling direction is perpendicular to the ink discharge direction and the length of the heater 493 is limited. Since the rate of heat conduction to the silicon substrate 130 increases, a lot of heat would be wasted.

Figure 18:
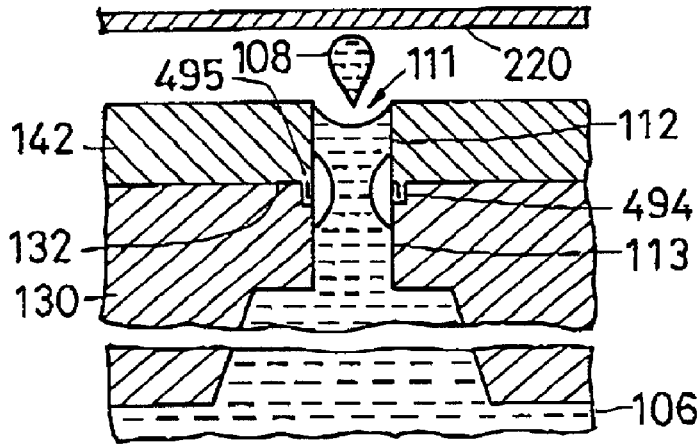
FIG. 18 is a cross-sectional view of another example of the nozzle shape of the ZBJ head.

FIG. 18 shows a configuration using an elbow heater. A cylindrical nozzle path is formed between a nozzle tip 111 and a barrel 113. A thermal $SiO_2$ layer 494 extends toward the barrel 113. An elbow heater 495 is deposited on an electrical connection (not shown) which is formed on the $SiO_2$ layer 494 and the heater 495. This configuration exhibits excellent spontaneous ink supply and high thermal insulation of the heater 495 from the substrate 130. On the other hand, this configuration has disadvantages of poor heat diffusion, limited adjustment of the nozzle length which requires a change in thickness of an enveloping layer 142, a bubbling direction perpendicular to the discharge direction of the ink, poor thermal coupling of the heater 495 with the ink due to an amorphous CVD glass layer lying between the heater 495 and the ink 106, a lower ability to change the length of the heater, and a complicated manufacturing process (described below).

Figure 19:
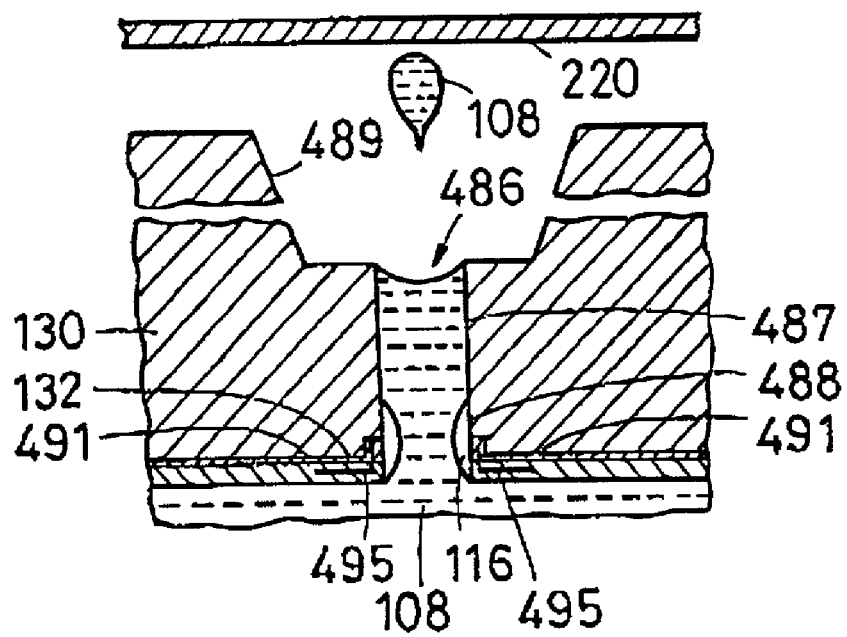
FIG. 19 is a cross-sectional view of another example of the nozzle shape of the ZBJ head.

FIG. 19 shows a reverse nozzle configuration using an elbow contact heater 495. This configuration has some advantages, namely, heat diffusion from the ink reservoir, spontaneous ink supply, and thermal insulation of the heater 495 from the substrate 130. The disadvantages of this configuration are a bubbling direction perpendicular to the discharge direction of the ink, poor thermal coupling of the heater 495 with the ink 106 due to an amorphous CVD glass layer lying therebetween, and a lower ability to change the length of the heater.

Figure 20:
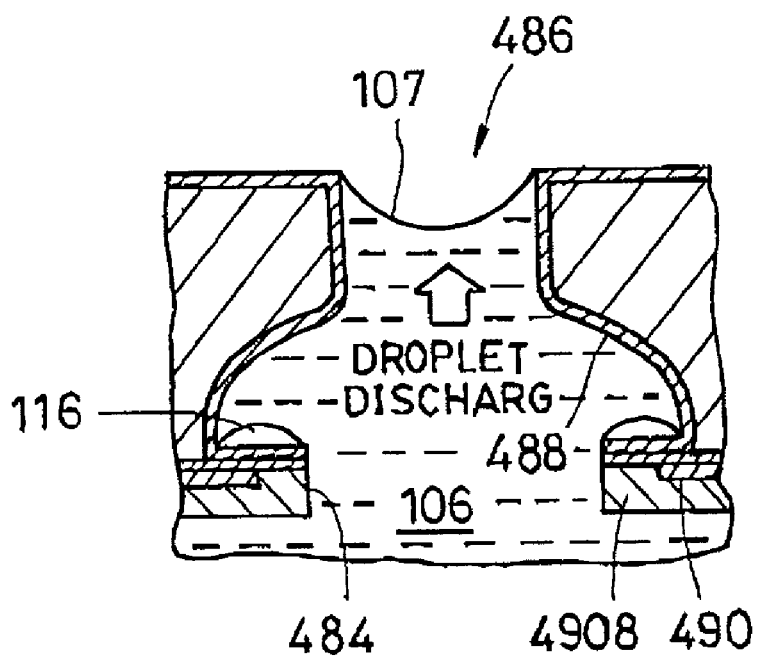
FIG. 20 is a cross-sectional view of another example of the nozzle shape of the ZBJ head.

FIG. 20 shows a nozzle configuration which is similar to that shown in FIG. 15. The relative size of an opening 484 to a nozzle tip 486, however, is different from that in FIG. 15 in order to enhance the capillary effect and the formation of the meniscus 107 for supplying the ink into the nozzle. In the configuration shown in FIG. 15, the opening 484 and the nozzle tip 486 have the same diameter. The diameter of the nozzle tip 486 may be varied depending on the design parameters such as the required liquid size, as shown in FIG. 20.

As shown in FIG. 20, in order to form a meniscus 107 by ink in the nozzle, the ink 106 flowing through the opening 484 must remain at the nozzle tip 486. When the nozzle tip 486 and the opening 484 have the same size, the meniscus 484 is formed at the opening 484 or the ink drips from the nozzle tip 486 depending on the pressure of the ink. Both phenomena are undesirable. Preferably, the opening 484 has a sufficiently large diameter permitting the supply of ink to the nozzle, while the nozzle tip 486 has a smaller diameter which precludes the formation of the meniscus 107. Thus, the nozzle is filled with the ink under a pressure which is higher than the bubbling pressure at the opening 484 and lower than the bubbling pressure at the nozzle tip 486. FIG. 20 shows this preferred structure. The diameter of the opening 484 is about 50% larger than that of the nozzle tip 486. Also, this configuration facilitates precise control of the liquid while maintaining a high refilling rate.

The operation of the ZBJ chip 100 according to the present invention having a novel discharge mechanism shown in FIGS. 21A to 21D and 22A to 22D differs from that of conventional bubble jet heads.

Figure 21A:
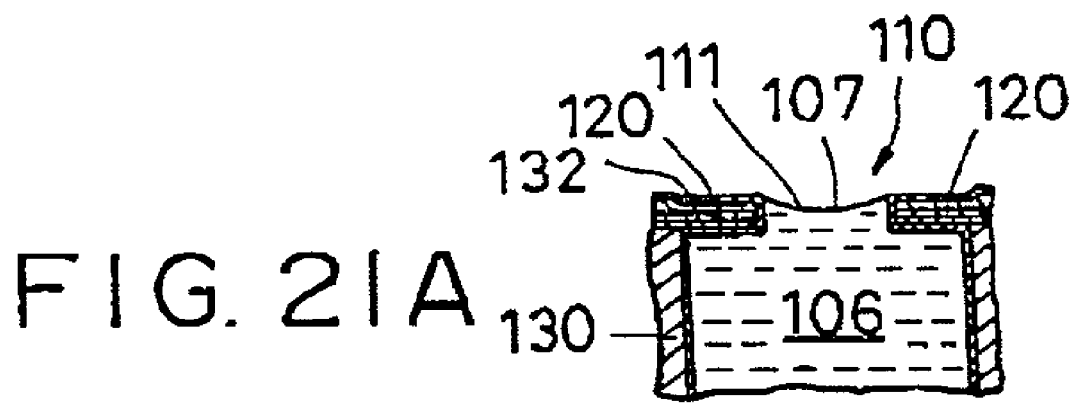
FIGS. 21A to 21D are cross-sectional views illustrating discharge of ink from a nozzle of a ZBJ chip.
Figure 21B:
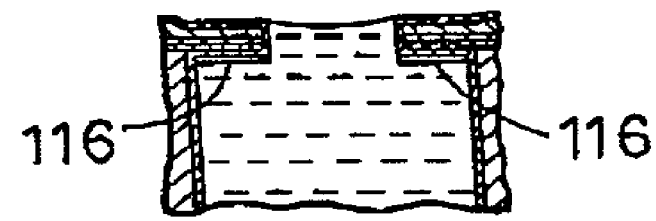
Figure 21C:
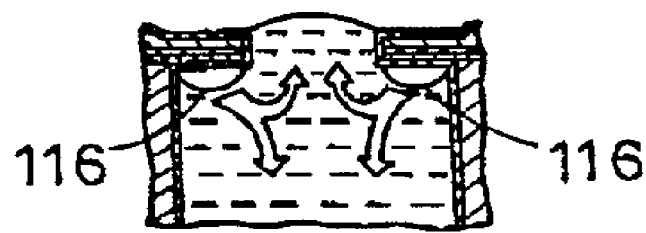
Figure 21D:
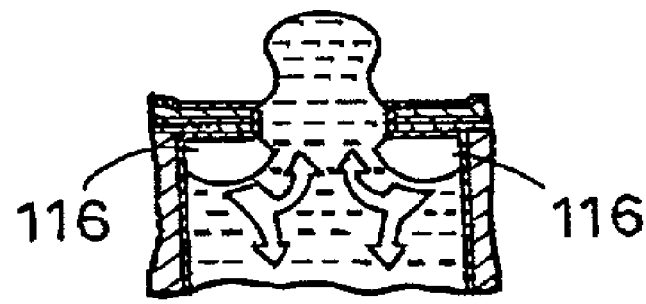

FIG. 21A shows one nozzle 110 of the ZBJ print chip 100 in an inactive mode in which a heater 120 is not energized. An ink 106 in the nozzle 110 forms a meniscus 107. With reference to FIG. 21B, the heater 120 is energized to heat a peripheral substrate 130 and a heating layer 132 to thereby heat the ink 106 in the nozzle 110. The ink 106 partially evaporates to form microbubbles. With reference to FIG. 21C, the microbubbles thermally grow and are combined to a large bubble 116. With reference to FIG. 21D, the expanding bubble 116 pushes out the ink 106 from the nozzle tip 111 at a high rate to form a protruding portion.

With reference to FIG. 22A, the heater 120 is deenergized, and the bubble 116 shrinks to pull the ink away from the protruding portion 118. With reference to FIG. 22B, the protruding portion 118 is separated from the ink 106 in the nozzle 110 and the shrinking bubble 116 pulls the meniscus 107 toward the rear side of the nozzle 110. With reference to FIG. 22C, the nozzle 110 is refilled with ink from the reservoir by the surface tension of the ink. The ink may be excessively supplied at some ink refill rate. With reference to FIG. 22D, the meniscus of the ink 106 vibrates and becomes a stationary state as shown in FIG. 21A. The decay time of this vibration is a factor which determines the maximum dot frequency.

With reference to FIG. 23, when the heater 120 is energized, part of the heat travels toward the ink 106 whereas the residue travels toward peripheral members.

FIG. 24 shows superheating of the ink. A thin superheated ink layer 109 is formed in the neighborhood of a passivation layer 144 in a cavity 112.

After the heater is deenergized, the excess heat must be rapidly removed. If the ink temperature exceeds 100° C. within a period of 200 μs in which the heater 120 is heated, the ink 106, which is substantially composed of water, generates bubbles. If a heat insulating layer is provided between the heater 120 and the ink 106, the ink droplet will not be precisely discharged.

The excess heat is dissipated by three paths. As a first path, the heat is dissipated through the ink. The ink temperature will be slightly increased thereby. Since the ink has low thermal conductivity, this path can only dissipates a small amount of heat.

The wall of the nozzle 110 is formed in the silicon substrate 130. Since silicon has a high thermal conductivity, the excess heat is dissipated through the wall at a high heat diffusion rate. However, all the bubbles 116 are not always in contact with the wall of the nozzle 110.

Figure 25:
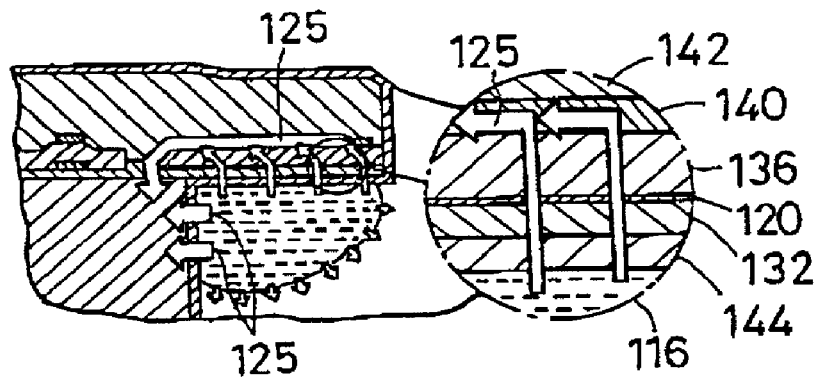
FIG. 25 illustrates conduction of heat generated in a heating element in a ZBJ chip.

The excess heat is also dissipated through the heater 120. Since the ink vapor must not come into contact with the heater 120 when the liquid is discharged, heat diffusion through the heater 120 is important. Most of the peripheral part of the heater 120 is composed of glass which has a low thermal conductivity. Thus, a heat shunt 140 is generated in the heater 120 so as to shunt the excess heat to the substrate 130. If the diffusion of the excess heat is completed within about 200 μs, such a heat shunt 140 is not necessary. FIG. 25 shows the flow of heat when the bubble 116 is cooled.

Figure 26:
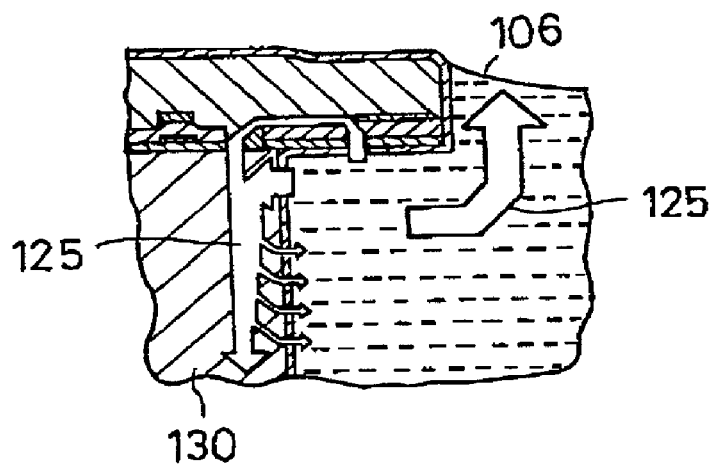
FIG. 26 illustrates conduction of heat generated in a heating element in a ZBJ chip.
Figure 27:
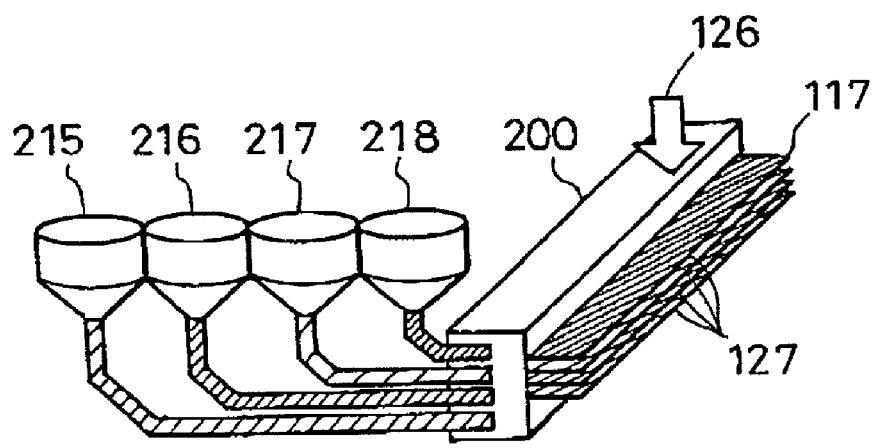
FIG. 27 illustrates conduction of heat generated in a heating element in a ZBJ chip.

FIG. 26 also shows a path for dissipating the excess heat. The excess heat is dissipated from the substrate 130 which functions as a thermal conduit from the heater 120. Part of the heat returns to the ink 106 and is lost when the liquid 108 is discharged. The residual heat is transferred toward the aluminum heatsinks 51 and 52 shown in FIG. 4 through the substrate 130.

Ink Channel

Figures 28A, 28B:
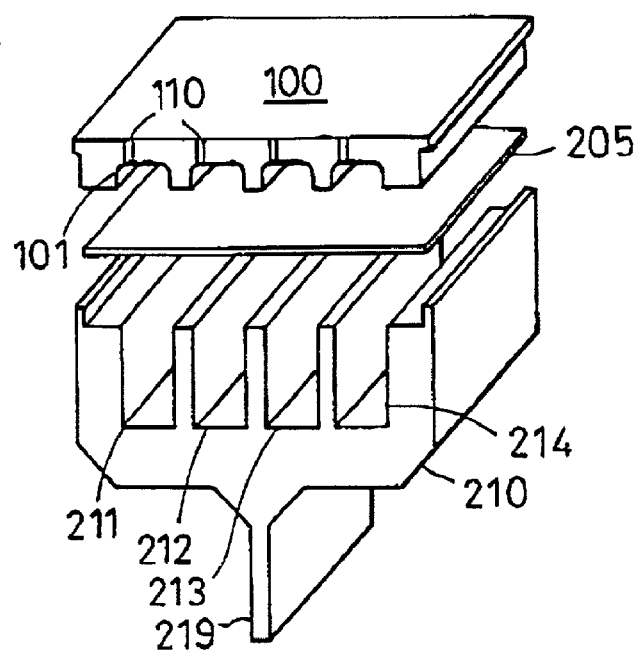
FIG. 28 is an exploded isometric view showing an arrangement of a ZBJ print head including a chip, a membrane filter, and an ink channel extrudate.

With reference to FIG. 28, the ZBJ head 200 includes, for example, the ZBJ chip 100 and a channel extrudate 210 having four ink channels 211, 212, 213, and 214 which correspond to different probe solutions. These ink channels 211, 212, 213, and 214 are formed by extruding aluminum.

Figure 29:
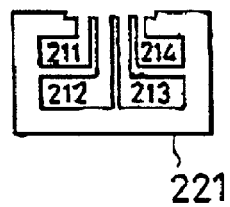
FIG. 29 is a cross-sectional view of another structure of the ink channel extrudate.

In specific cases, the ink channels 211, 212, 213, and 214 shown in FIG. 28 may not generate adequate ink flows. In contrast, the ink channels 211, 212, 213, and 214 shown in FIG. 29 have higher ink flow rates and does not cause such a problem. With reference to FIG. 28, an absolute membrane filter 205 with a pore size of 10 µm is provided between the ZBJ chip 100 and the channel extrudate 210 to protect the head from contamination of the probe solutions. If the absolute membrane filter 205 is shrinkable, the filter 205 also functions as a gasket to prevent mixing of the four probe solutions. Both ends of the assembled ZBJ head 200 are preferably sealed to isolate it from the atmosphere. In such a configuration, the alignment precision of the chip 100 and the channel extrudate 210 is about ±50 µm.

An inkjet head used in production of a two-dimensional probe array can be designed based on the above-described ZBJ head using probe solutions instead of the aqueous inks. As described above, the ZBJ head has ink inlets on one face and nozzles on the other face in the Z direction of the integrated head chip. Thus, the ink flows and is discharged in the same direction (not orthogonal). Accordingly, a ZBJ head having many reservoirs and nozzles can be readily formed. The resulting ZBJ head is suitable for use for discharging many probe solutions.

Figure 30:
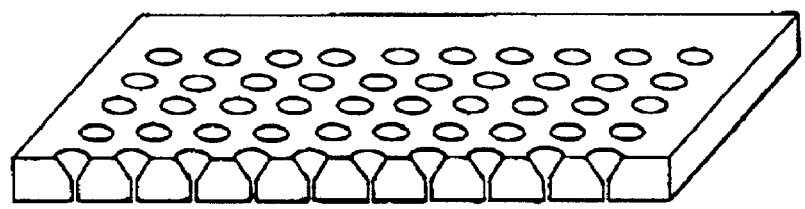
FIG. 30 is an outline view of a liquid discharging device having a nozzle arrangement in a two-dimensional array according to the present invention.

FIG. 30 is an outline view of an inkjet head provided with a two-dimensional array of nozzles. This inkjet head can be formed by any one of the above-described methods. As shown in FIG. 30, the nozzles and the reservoirs are integrated into a two-dimensional array in this liquid discharging device. However, the inkjet head may be composed of a one-dimensional array. The liquid discharging device may be formed by bonding an upper piece and a lower piece. The inkjet head may have a two-dimensional array which is composed of a plurality of one-dimensional inkjet heads.

The volume of the probe solution discharged from one nozzle is determined based on the viscosity of the probe solution, the affinity between the probe solution and the solid-phase substrate, and the reactivity of the probe with the solid-phase substrate, and the like, in view of the dot size and the shape of the array to be formed. Generally, the probe solutions contain aqueous solvents. The volume discharged from each nozzle of the inkjet head is generally set in the range from 0.1 picoliter to 100 picoliters. The nozzle diameter and the like are designed according to the volume.

The dot of probe solution discharged from each nozzle onto the solid-phase substrate is originally circular. A plurality of fine circular dots may be discharged densely to form a rectangular discharged array block. Such an array block occupies an area of 0.01 µm² (for example, 0.1 µm×0.1 µm) to 40,000 µm² (for example, 200 µm×200 µm). This area is determined by the size of the array itself and the density of the array matrix.

The size or volume of the reservoir may be determined based on the volume of the probe solution to be discharged from the nozzle and the number of the array to be fabricated. When the inkjet head is integrally formed by shaping a solid-phase substrate such as a silicon substrate, the nozzle diameter and the volume of the probe solution discharged lie within certain ranges. The shape shown in FIG. 6 will have a sufficient volume in some cases. When a large volume of probe solution is discharged from a nozzle or when many arrays are produced, the probe solution is additionally supplied to the corresponding reservoir during the production of all the arrays. Alternatively, auxiliary reservoirs may be provided in addition to the reservoirs which are arranged on one surface of the substrate. In this case, the probe solutions are supplied from the auxiliary reservoirs. The shape of the auxiliary reservoirs is designed so that the probe solutions are readily supplied.

The reservoirs may be arranged so as to correspond to the nozzle array. When there is no space for arranging reservoirs with a large volume due to geometric limitations caused by the nozzle array and the like, these reservoirs may be connected to auxiliary reservoirs having larger volumes using a slow channel or the like.

The liquid discharging device is preferably of a two-dimensional array type which is integrally formed. Alternatively, the liquid discharging device may be a combination of a plurality of one-dimensional arrays.

The inkjet type described above is a thermal jet type. Alternatively, a piezo-jet type with a two-dimensional array may be used depending on the volume of solutions to be discharged.

The reservoirs and nozzles are also arranged into an array which corresponds to the array of the probes. The number of reservoirs and nozzles may be determined depending on the types of probe required without limitation. The diameter and number of the dots, the application density, and the array shape depends on the method for making the liquid discharging device. The total number of reservoirs and nozzles is determined based on the number of types of probe which is required and may be 100,000 or more.

The probes arranged in a two-dimensional array on the substrate belong to the same type or category in a broad sense. In other words, the type of these probes itself is not an important factor in the present invention, as long as each probe is dischargeable as a solution from the liquid discharging device. The method according to the present invention is applicable to probes which can be fixed on a substrate. Examples of probes satisfying such a requirement include DNAs, RNAs, complimentary DNAs (cDNAs), PNAs, oligonucleotides, polynucleotides, other nucleic acids, oligopeptides, polypeptides, proteins, enzymes, substrates to enzymes, antibodies, epitopes to antibodies, antigens, hormones, hormone receptors, ligands, ligand receptors, oligosaccharides, and polysaccharides.

Preferably, each of these probes has a structure which can bond to the solid-phase substrate after being discharged thereon as a probe solution. Such a structure which can bond to the solid-phase substrate can be preliminarily formed by introducing an organic functional group into a probe molecule. Examples of such organic functional groups include an amino group, a mercapto group, a carboxyl group, a hydroxyl group, acid halides (—COX), halides (—X), aziridine, maleimides, succinimides, isothiocyanates, sulfonyl chlorides (—SO$_2$Cl), aldehydes (formyl groups: —CHO), hydrazines, and iodoacetoamides. In such a case, another organic functional group which can react with any one of the above organic functional groups is preliminarily introduced onto the substrate surface.

(2) Embodiment Using Liquid Discharging Device

A thermal-jet liquid discharging device having a two-dimensional array of nozzles will now be described. This liquid discharging device is used for applying probe solutions onto a solid-phase substrate to form dots of the probe solutions.

(Structure of Liquid Discharging Device for Discharging Probe Solutions)

First Embodiment

Figure 31:
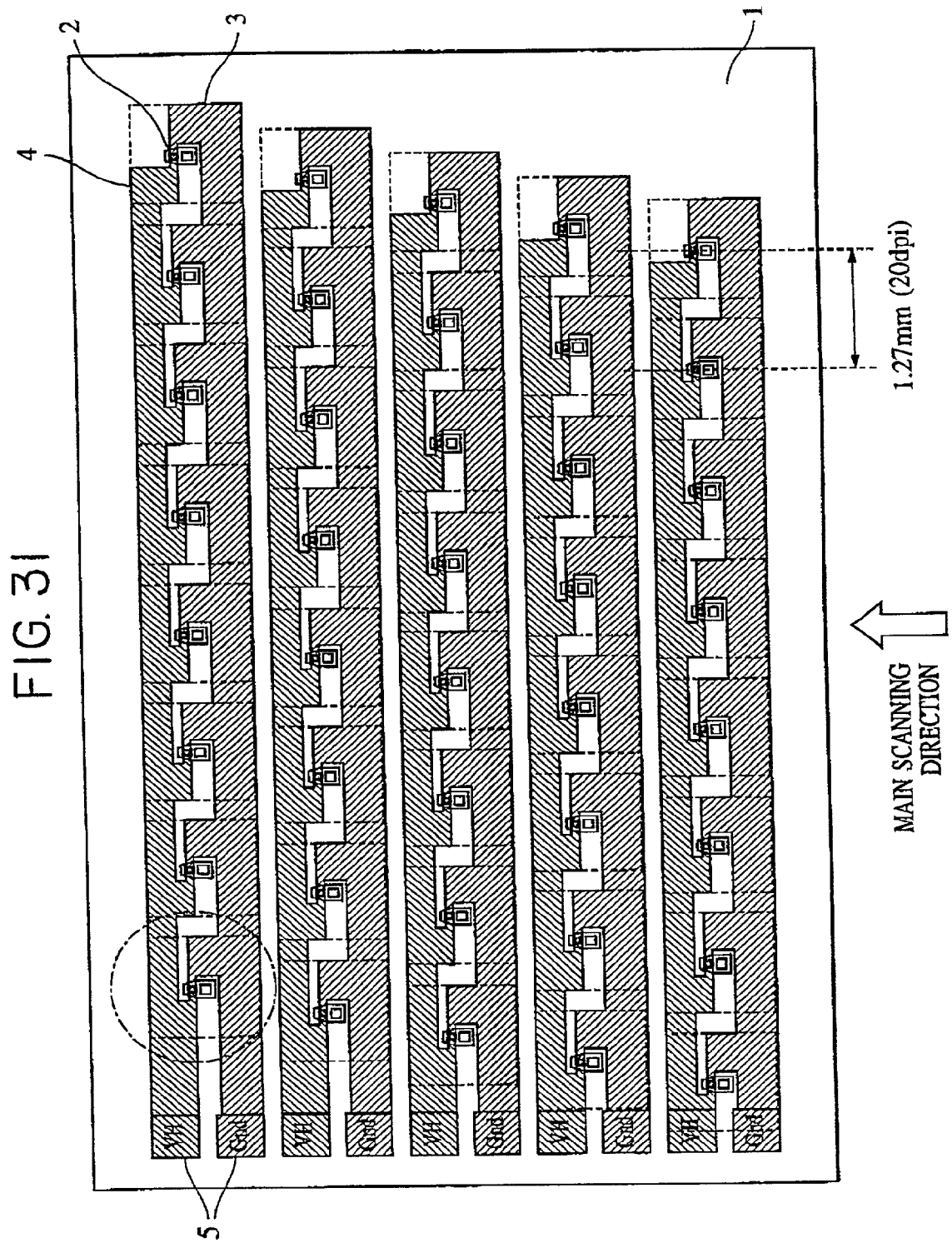
FIG. 31 is a schematic view of a semiconductor chip constituting a thermal-jet liquid discharging device according to the present invention.

FIG. 31 shows a schematic view of the front surface of a semiconductor chip having nozzles and liquid channels which are components of a thermal-jet liquid discharging device. In the present invention, a plurality of chips is used to form one liquid discharging device, as described below in detail. Alternatively, the liquid discharging device may be formed of a single chip in the present invention.

The functions of the liquid discharging device significantly depend on the structure of the chip. A glass plate chip may be used instead of a Si semiconductor chip.

Figure 32:
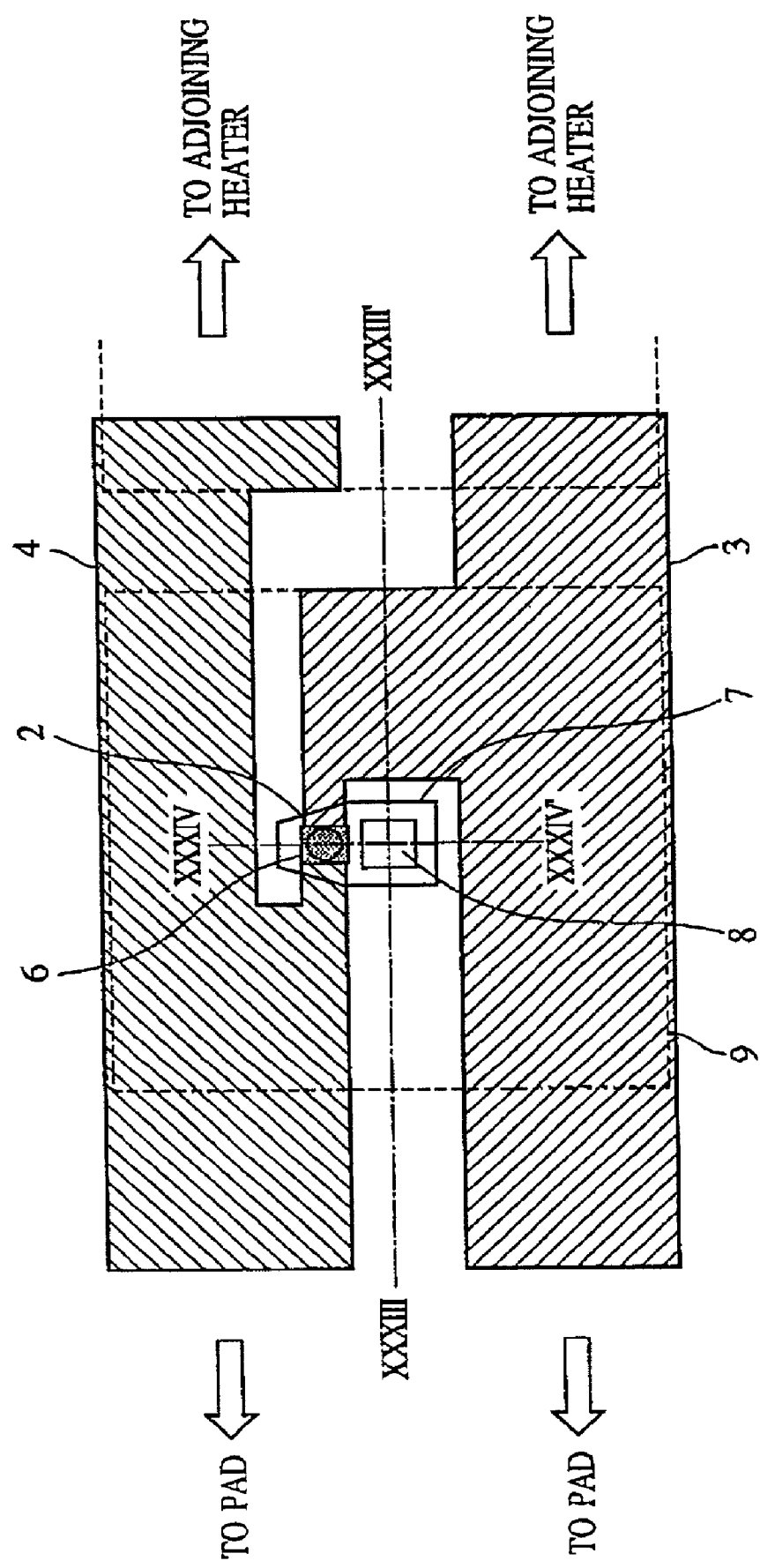
FIG. 32 is an enlarged view in the vicinity of a nozzle shown in FIG. 31.

FIG. 32 is an enlarged view of the semiconductor chip in the vicinity of a nozzle (the circled portion in FIG. 31). In FIGS. 31 and 32, reference numeral 1 represents a silicon semiconductor substrate, reference numeral 2 represents a heating element which is composed of TaN, TaSiN, TaAl, or the like and generates energy for discharging the solution, reference numeral 3 represents a first lead composed of aluminum or the like, reference numeral 4 represents a second lead composed of aluminum or the like, reference numeral 5 represents a pad for ensuring an external electrical connection with the liquid discharging device, reference numeral 6 represents a nozzle for discharging the solution, reference numeral 7 represents a flow path, and reference numeral 8 represents an inlet port for supplying the solution from the rear to the front of the substrate. The inlet port is formed by anisotropic etching of the silicon substrate and is expanded as shown by a dotted rectangule 9 at the rear side of the substrate, as described below. This inlet port also functions as a reservoir.

The liquid discharging device moves in the direction shown by the arrows. Hereinafter, this direction is referred to as a main scanning direction.

As shown in FIG. 31, the chip includes five rows of nozzle groups which are arranged so that each row is shifted from others by 254 µm (corresponding to 100 dpi) (offset arrangement).

The offset arrangement will be described in detail. In FIG. 31, the leftmost or first nozzle in the second row is shifted to the left by a predetermined distance relative to the leftmost or first nozzle in the first row. The leftmost nozzles of the third to fifth rows are also shifted to the left by the same distance. The second to eighth nozzles in each row are also shifted to the left by the same distance. According to the offset arrangement shown in FIG. 31, no nozzles overlap in the main scanning direction; hence, the horizontal dot density of the probe solutions on the solid-phase substrate can be effectively increased (for example, see spots in the first row shown by ● in the vertical direction in FIG. 42).

In the vertical direction in FIG. 31, two adjoining nozzle lines are arranged at a pitch of 1.27 mm (corresponding to 20 dpi).

Eight heaters included in one nozzle group are connected to each other with the first and second leads. The length of the long side of the chip is about 12 mm and the length of the short side is about 7 mm. One chip has 40 nozzles.

As shown in FIG. 31, the ends of each heating element are connected to the first and second leads.

Figure 33:
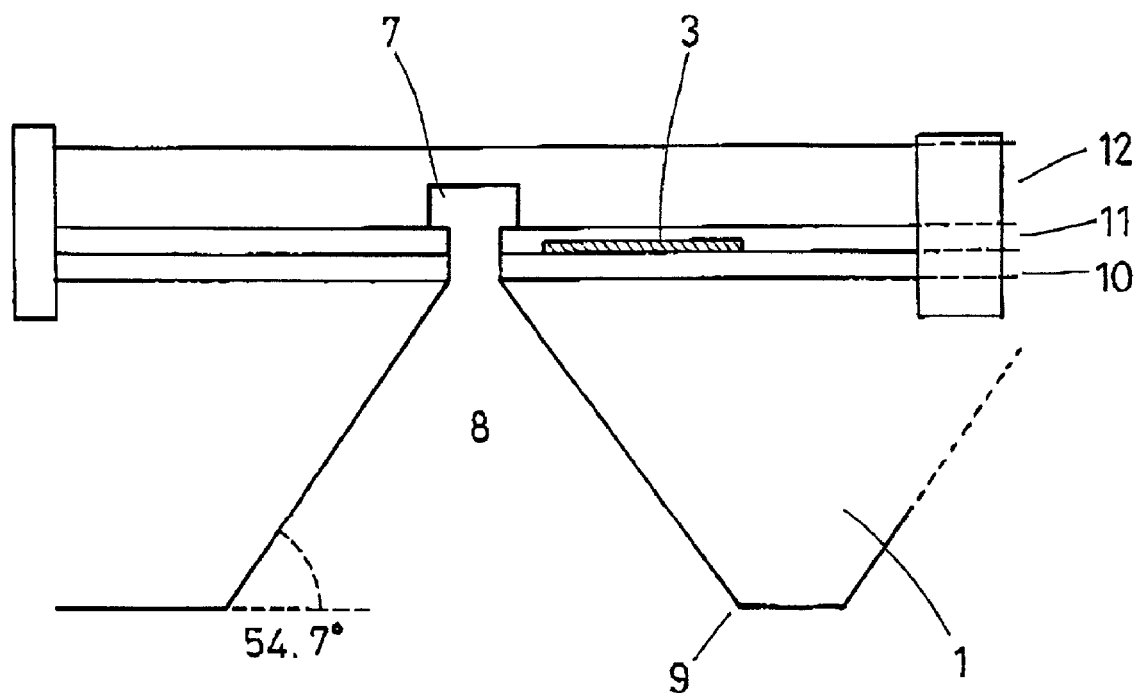
FIG. 33 is a cross-sectional view taken along line XXXIII-XXXIII in FIG. 32.
Figure 36:
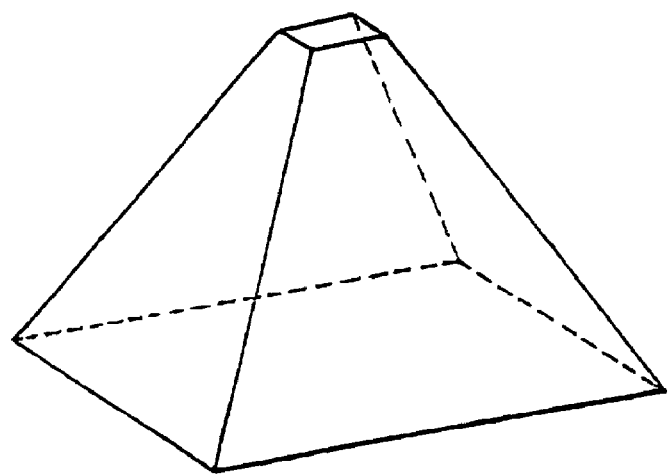
FIG. 36 is a schematic view of a reservoir of a semiconductor chip constituting a thermal-jet liquid discharging device.

FIG. 33 is a cross-sectional view taken from line XXXIII-XXXIII' in FIG. 32, and FIG. 34 is a cross-sectional view taken along line XXXIV-XXXIV' in FIG. 32. FIG. 35 is a schematic view of the rear face of the semiconductor chip shown in FIG. 31.

In FIGS. 33 and 34, the same components as those in FIGS. 31 and 32 are referred to with the same reference numbers. Reference numeral 10 represents an insulating film, reference numeral 11 represents a protective film, reference numeral 12 represents a nozzle member, and reference numeral 13 represents an anti-cavitation film composed of Ta or the like.

The insulating film 10 may be an oxide film formed by thermal oxidation of a silicon substrate or a nitride film formed by CVD. The protective film 11 insulates leads to be insulated and protects the heating elements and the leads from solutions. Thus, the protective film 11 is provided at positions requiring such insulation and protection. The protective film 11 may be an oxide film, a nitride film, or the like, formed by CVD. The nozzle member 12 constituting the nozzle 6 and the channel 7 may be formed of glass or the like. The flow path on the substrate may be formed by bonding the nozzle member 12 having the nozzle and the channel to a semiconductor substrate or may be directly formed onto a semiconductor substrate using a photolithographic semiconductor process.

A photolithographic process is preferable to form a semiconductor chip having a large area because such a large semiconductor chip cannot be formed by the above bonding process of the nozzle member to the semiconductor substrate.

The inlet port 8 is formed by anisotropic etching of silicon using a tetramethylammonium hydroxide (TMAH) solution. As shown in FIG. 33, the inlet port 8 has an angle of 54.7 degrees to the substrate surface. The shape of the inlet port 8 is a truncated quadrangular pyramid. When the width of the inlet port 8 is set to 100 µm and when the thickness of the silicon substrate is set to 625 µm, the width of the inlet port at the rear face becomes about 1 mm.

The relative position of the inlet port 8 to the heating element 2 is determined photolithography. When the nozzle is also formed by the photolithography, the relative position between the nozzle and the reservoir can be precisely defined. For example, the direction of the flow of the solution from the inlet port and the direction of discharge of the solution from the nozzle can be made the same so that the flow path in the channel 7 is significantly decreased. Thus, bubbles do not remain in the flow channel.

In conventional inkjet printing heads, inlet ports are provided to introduce ink from an ink reservoir separately provided on a rear face of a substrate to a heating section. In contrast, as described above, in the liquid discharging device for making the probe array, the inlet port integrally formed on the substrate can be used as a reservoir because the volume of the solution to be discharged is small.

The volume of the above-described inlet port is about 0.23 microliter. Since the discharged volume in this embodiment is 24 picoliters, this volume of the inlet port allows production of about 9,600 probe arrays.

FIG. 35 is a plan view of the inlet port when the chip is viewed from the rear face. As shown in FIG. 34, the solution is introduced from the rear face to the front face of the substrate through the inlet port 8, and is introduced to the nozzle 6 through the channel 7.

Figure 37:
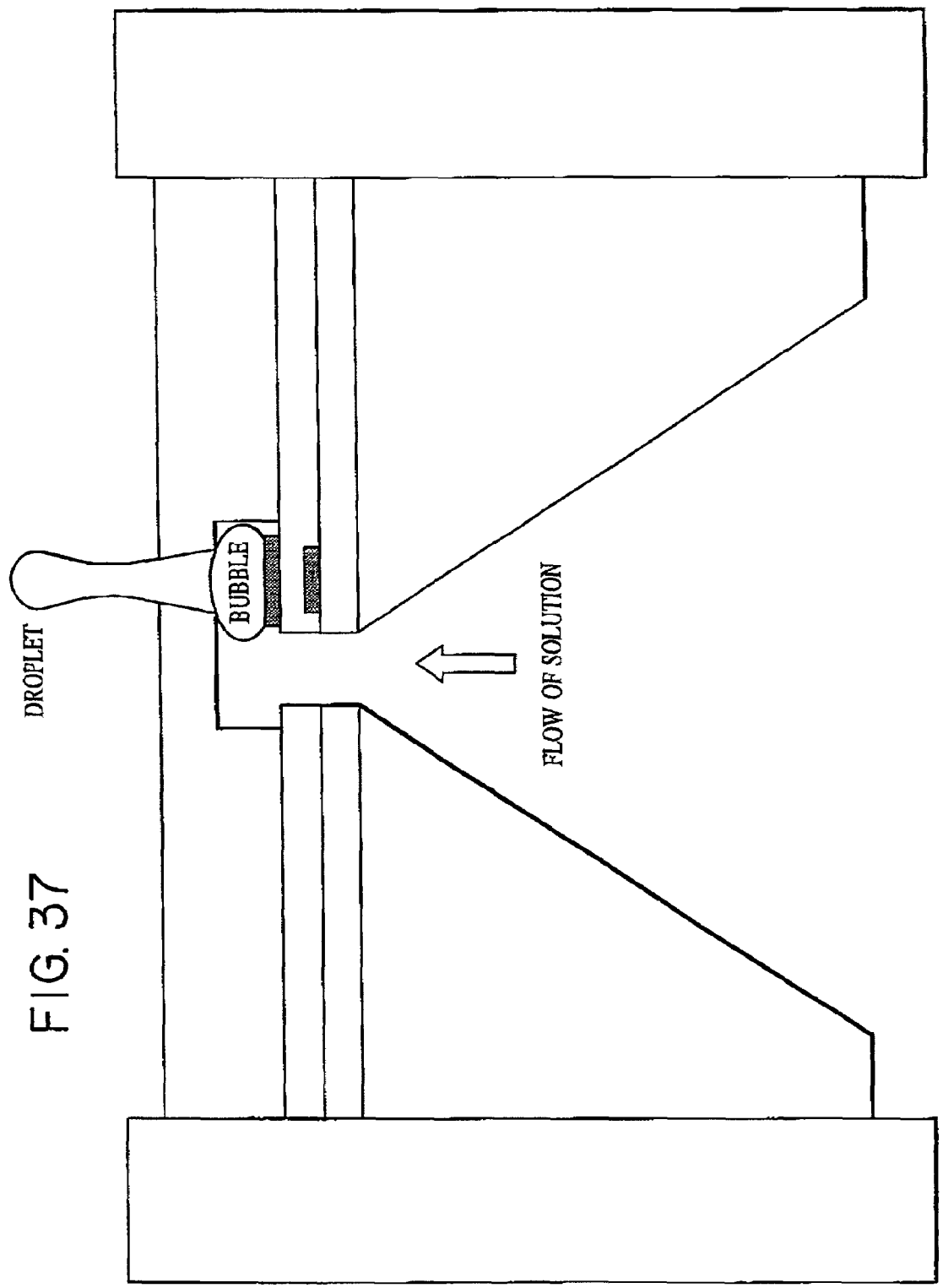
FIG. 37 is a schematic view illustrating discharge of liquid from a thermal-jet liquid discharging device.

When a voltage is applied across both ends of the heating element, the solution in the vicinity of the heater is heated to generate film bubbling, thus discharging the liquid as a droplet as shown in FIG. 37. Preferably, the volume of the droplet is about 24 picoliters.

Stable film bubbling is essential for stable liquid discharge. A pulsed voltage of 0.1 to 5 µs is preferably applied to the heater to ensure stable film bubbling.

In order to precisely control the volume of each probe in the probe array, a system in which bubbles generated by the heater communicate with the atmosphere of the outside of the nozzles is preferred because this system can stably discharge a predetermined volume of solutions from the nozzle. Such a system is disclosed in Japanese Laid-Open Patent Nos. 4-10940, 4-10941, and 4-10942.

Figure 38:
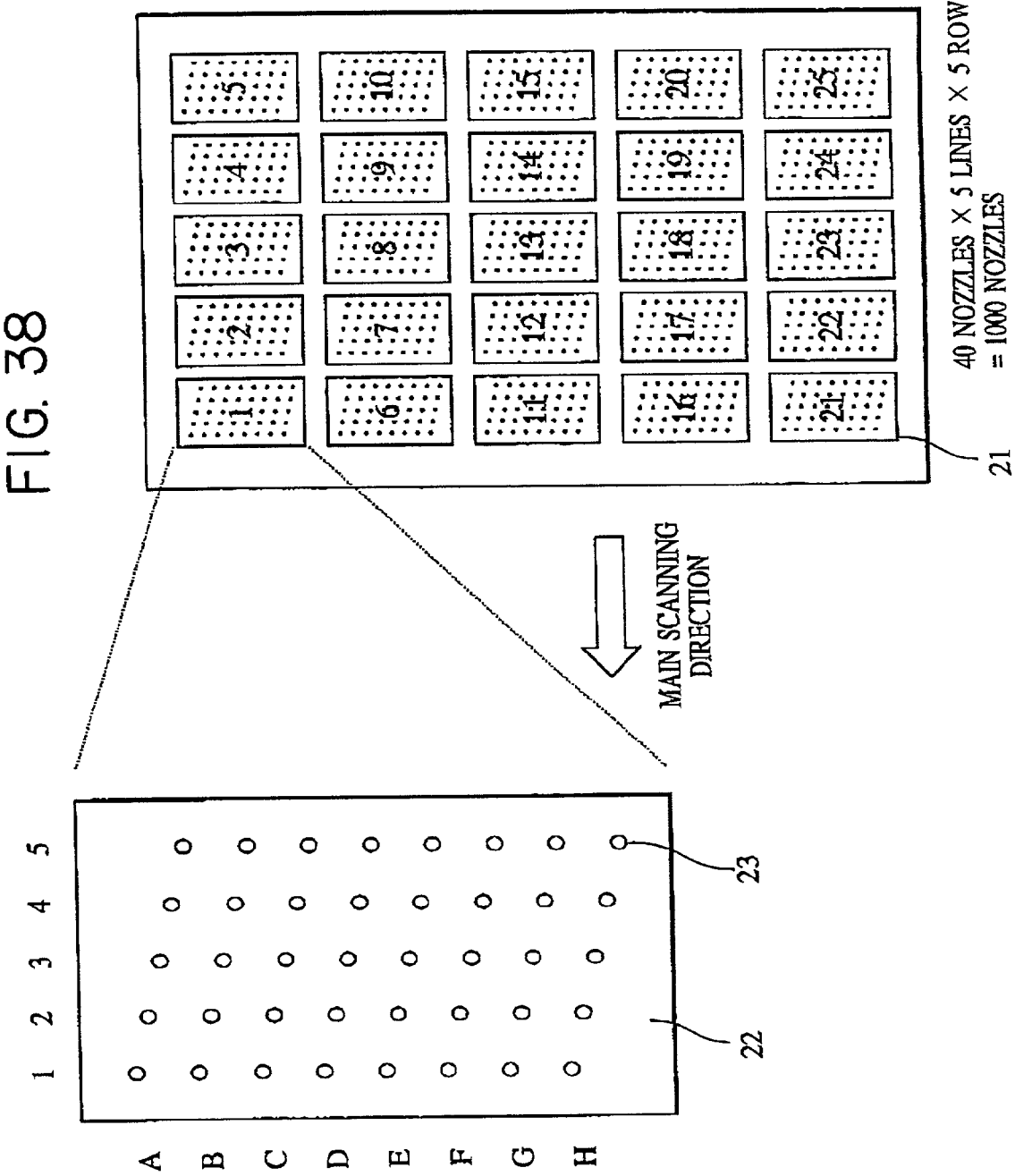
FIG. 38 is a schematic view of a liquid discharging device.

FIG. 38 is a schematic view of the liquid discharging device according to the present invention. Reference numeral 21 represents the liquid discharging device, reference numeral 22 represents the semiconductor chip shown in FIG. 37, and reference numeral 23 represents a nozzle. In the chip 22, only the nozzle 23 is depicted in FIG. 37 for convenience of the description. In this embodiment, the liquid discharging device has 25 semiconductor chips 22, that is five in each line and five in each row. Since one chip includes 40 nozzles, this liquid discharging device has 1,000 nozzles.

Figure 39:
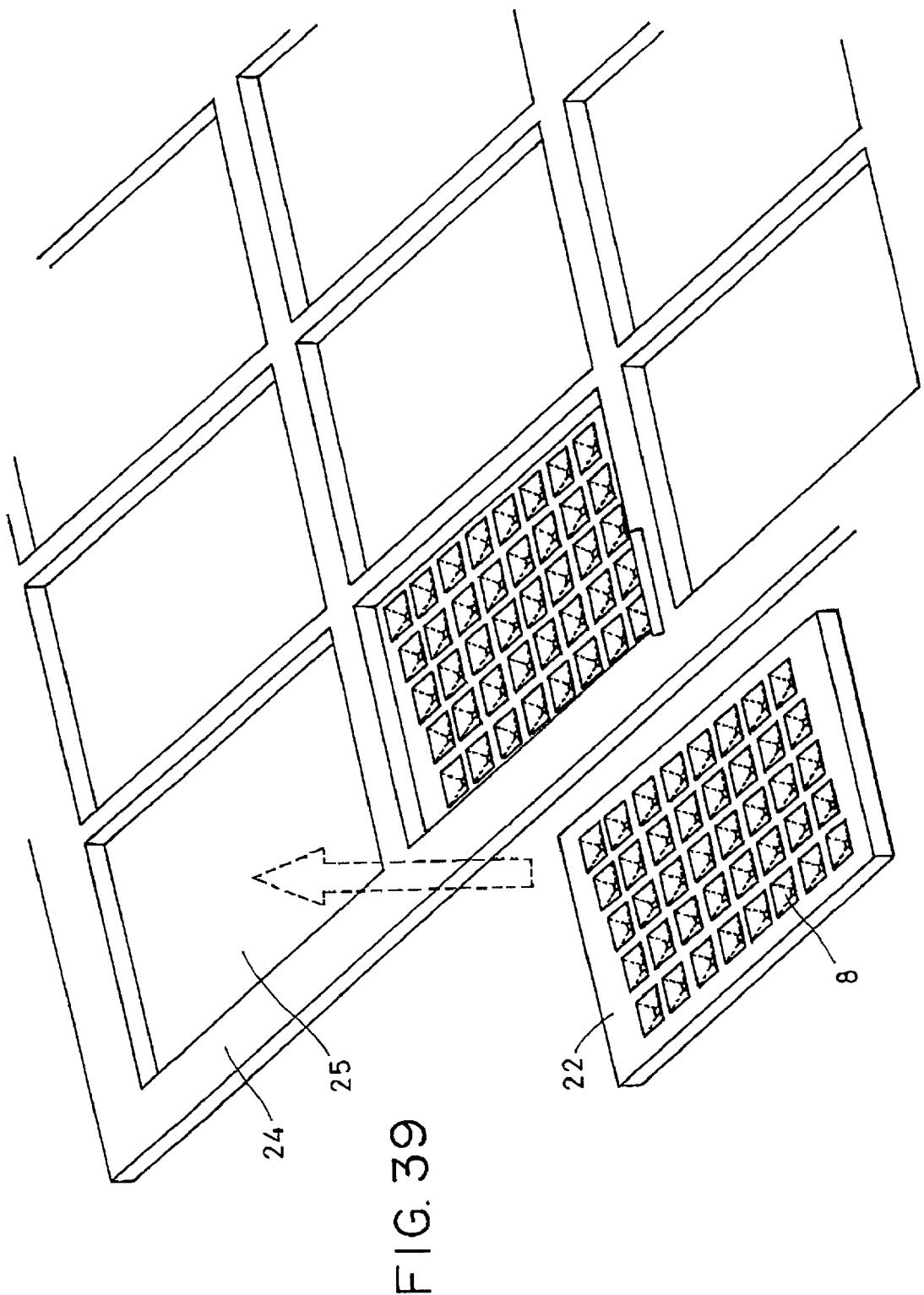
FIG. 39 is a schematic view of a liquid discharging device.

FIG. 39 shows a more detailed structure of this liquid discharging device. The liquid discharging device is formed by bonding a substrate 24 having rectangular holes to chips 22. A pad of each chip 22 is externally connected to the liquid discharging device with a flexible print board (not shown in the drawing). Probe solutions are supplied into the inlet ports 8.

Second Embodiment

Figure 40:
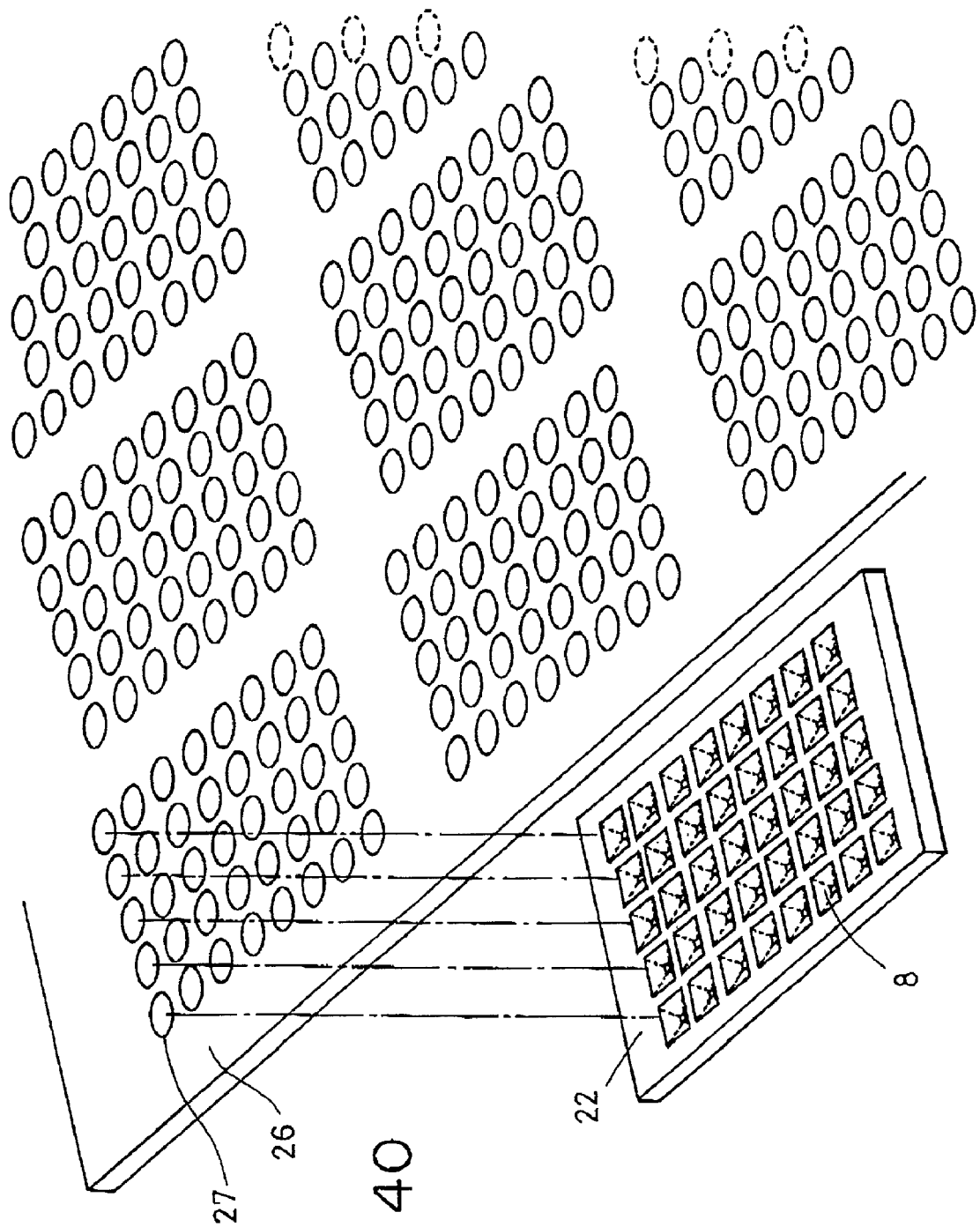
FIG. 40 is a schematic view of another embodiment of the liquid discharging device.

FIG. 40 shows another embodiment of the liquid discharging device of the present invention. A substrate 26 is composed of alumina, resin, or the like and has holes 27 at positions corresponding to the inlet ports 8 of the chip 22. In this embodiment, the holes 27 also function as second reservoirs. Thus, the total volume of the reservoir is the sum of the volume of the inlet port and the volume of the second reservoir. The volume of the second reservoir can be appropriately changed by varying the thickness of the substrate 26 and the size of the hole 27. Moreover, solutions may be supplied from tubes which are connected to these holes.

Structure of Apparatus for Making Probe Array

Figure 41:
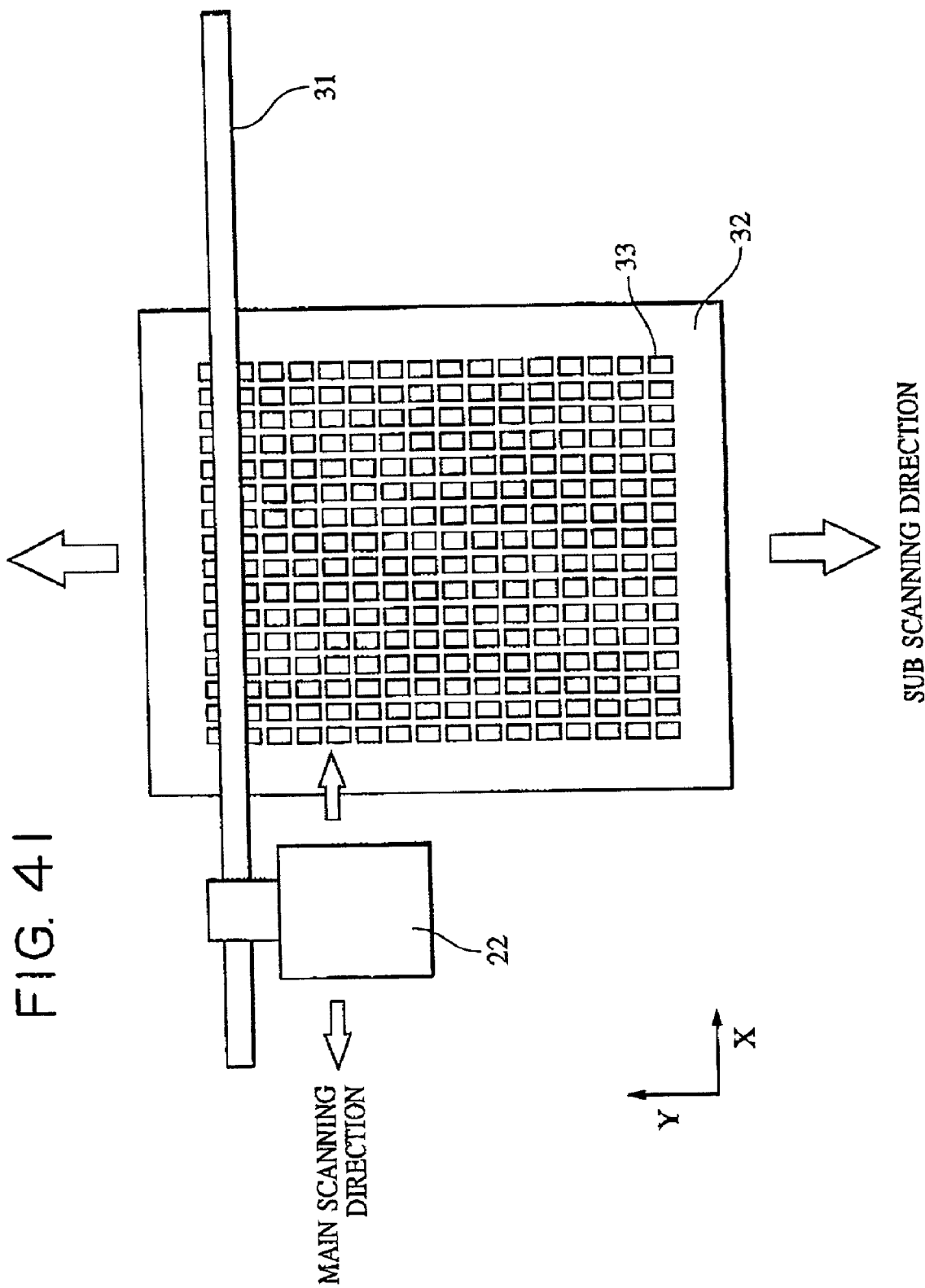
FIG. 41 is a schematic view illustrating the structure of an apparatus for making a probe array.

FIG. 41 is a schematic view of an apparatus for making a probe array using a liquid discharging device 22. Reference numeral 31 represents a shaft which is a guide for moving the liquid discharging device 22 in the main scanning direction, reference numeral 32 represents a stage for holding probe arrays, and reference numeral 33 represents a glass substrate for forming a probe array. The liquid discharging device 22 moves in the X direction (the main scanning direction) while the stage moves in the Y direction (the sub scanning direction). Thus, the liquid discharging device 22 can move two-dimensionally relative to the stage.

In FIG. 41, a plurality of glass substrates are held on the stage 32. Alternatively, probe arrays may be formed on a large glass substrate which is then divided into the individual probe arrays.

(Application of Probe Solution Using Thermal-Jet Liquid Discharging Device)

A method for making a probe array will now be described.

The following embodiments relate to the arrangement and control of a nozzle group in the case of using a liquid discharging device having a two-dimensional array of nozzles which is composed of a plurality of chips.

(a) Nozzles in each chip are arranged into a two-dimensional array of m lines and n rows, and heating elements corresponding to the n nozzles in the same row are connected to a first common lead and a second common lead.

(b) Nozzles in each chip are arranged into a two-dimensional array of m lines and n rows, and heating elements corresponding to the n nozzles in the same line are connected to a first common lead and a second common lead and constitute a heater group. Each heater group is energized sequentially with a given timing.

(c) Nozzles in each chip are arranged into a two-dimensional array of m lines and n rows, and an X-row nozzle group ($1 \leq X \leq n$) including m nozzles is shifted to the adjoining nozzle groups (offset arrangement).

(d) Nozzles in each chip are arranged into a two-dimensional array of m lines and n rows, and an X-row nozzle group ($1 \leq X \leq n$) including m nozzles which are arranged at a pitch Y is shifted to the next nozzle group (offset arrangement) wherein the offset distance is Y/n.

(e) Nozzles in each chip are arranged into a two-dimensional array of m lines and n rows, and the X-row nozzle groups ($1 \leq X \leq n$), each including m nozzles, are arranged with a space Z. After the X-row nozzle group discharges probe solutions, the liquid discharging device moves by the distance Z, and the next nozzle group discharges probe solutions.

In the liquid discharging device of the present invention, the time interval and the pattern for discharging the probe solutions from the nozzles may be controlled so that the probe solutions can be discharged onto the solid-phase substrate at higher density than the nozzle density of the liquid discharging device.

Figure 42:
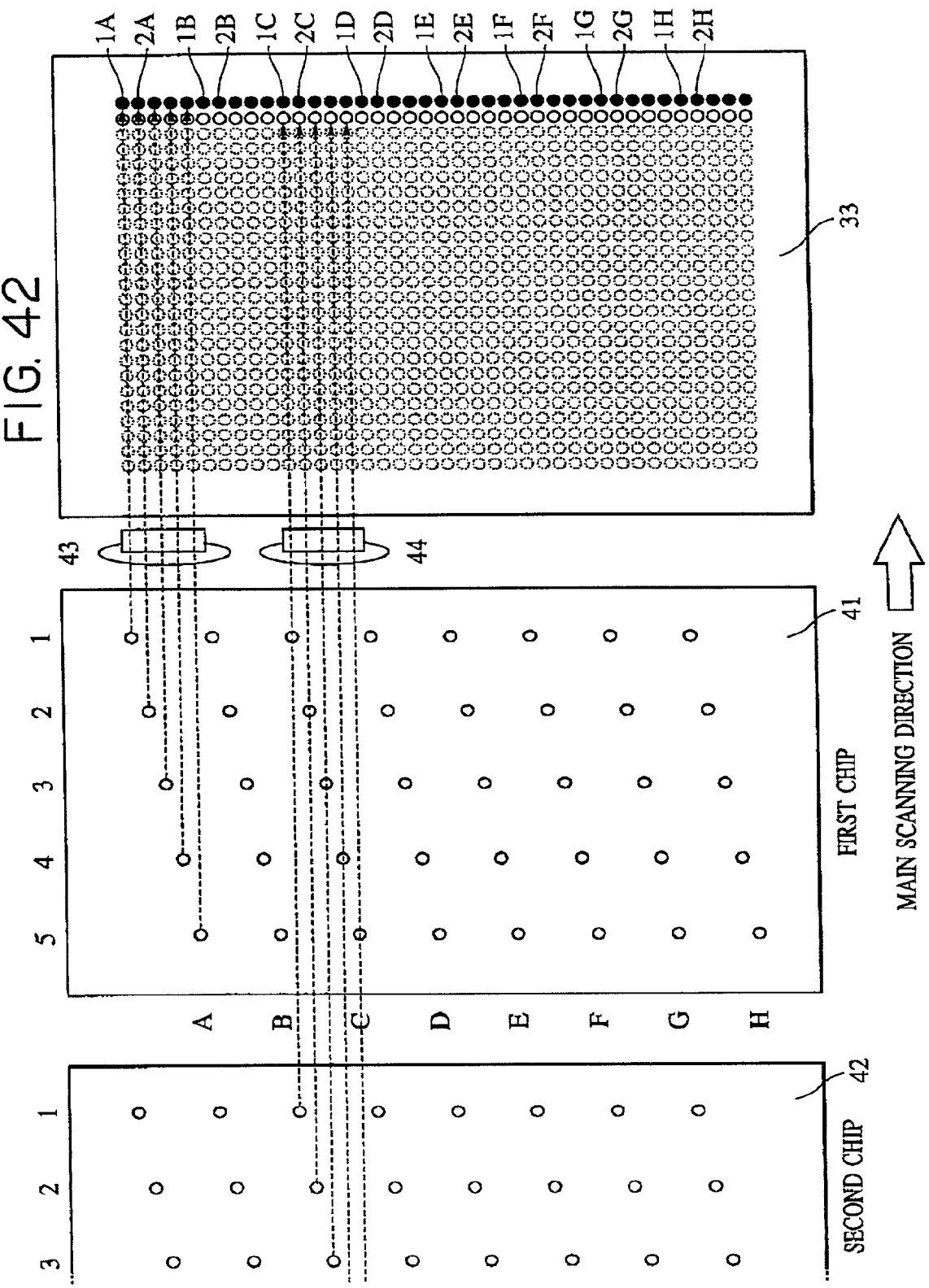
FIG. 42 is a schematic view illustrating a coating process of a probe solution using a thermal-jet liquid discharging device.

A method for making the probe array will now be described with reference to the drawings. FIG. 42 is a schematic view of a method for applying probe solutions using a thermal-jet liquid discharging device. Reference numerals 41 and 42 represent semiconductor chips and reference numeral 33 represents a probe array. In FIG. 42, the front surface of the probe array is depicted. Thus, the arrangement of the nozzles in the chip and the main scanning direction are opposite to those shown in FIG. 38 in the horizontal direction.

The chip 41 in FIG. 42 corresponds to the chip 1 in FIG. 38 and the chip 42 in FIG. 42 corresponds to the chip 2 in FIG. 38. As shown in FIG. 42, each chip includes a plurality of nozzle groups, and each nozzle group has eight nozzles. These nozzle groups are aligned in an offset arrangement. As described above, heaters in one nozzle group are connected to a first common lead and a second common lead. When a voltage is applied between a pair of pads connected to these leads, the eight nozzles belonging to the same nozzle group simultaneously discharge the probe solutions.

In FIGS. 38 and 42, numerals 1 to 5 represent the nozzle groups and letters A to H represent individual nozzles constituting each nozzle group.

First, the first nozzle group forms eight probes 1A, 1B, 1C, 1D, 1E, 1F, 1G, and 1H in a probe array. After the liquid discharging device moves by, for example, 127 mm (corresponding to 20 dpi) in the main scanning direction, the second nozzle group discharges so as to form eight probes 2A, 2B, 2C, 2D, 2E, 2F, 2G, and 2H in the same probe array. Similarly, each of the third to fifth nozzle groups sequentially form eight probes. In the probe array 33, 40 probes (shown by black circles) belonging to the first probe is group are thereby arranged. The center-to-center distance between the adjoining two probes is 254 µm (100 dpi).

Accordingly, 40 types of solution which are discharged from the first chip form the first probe group in the probe array. This state is schematically shown by numeral 43 in FIG. 42 wherein only five probes 1A to 5A among the 40 probes are shown.

Next, solutions are discharged from the second chip 42 by a similar process to arrange probes (white circles in FIG. 42) belonging to the second row in the probe array. Herein, the driving time interval is controlled so that the first-row probe group prepared by the first chip and the second-row probe group prepared by the second chip have a center-to-center distance of 254 μm (100 dpi).

As in the first chip, 40 types of solution which are discharged from the second chip form the second probe group in the probe array. This state is schematically shown by numeral 44 in FIG. 42 wherein only five probes 1C to 5C among the 40 probes are shown.

Furthermore, solutions are discharged by a similar procedure using third to twenty-fifth chips to complete the probe array 33 (each probe is shown by a circular dot in FIG. 42).

As described above, the liquid discharging device shown in FIG. 38 can form a 100-dpi probe array of 40 lines and 25 rows. A probe array having more probes can also be prepared in the same manner.

In the above embodiments, the chips of the liquid discharging device are composed of silicon. Since the substrate has a simple configuration including heaters and leads connected to the heater, an inexpensive substrate such as a glass substrate may be used instead of the silicon substrate.

In the above embodiment, 25 semiconductor chips each having 40 nozzles are arranged into an array of five lines and five rows to form the liquid discharging device. The number and arrangement of the nozzles may be appropriately determined according to the application.

When a liquid discharging device having a one-dimensional array of one line and 25 rows is prepared using the above-described semiconductor chips, the probe array can be formed only by main scanning. Thus, the apparatus for making the probe array has a more simple structure than that shown in FIG. 41.

This method for making the liquid discharging device uses a plurality of chips. Since these chips have simple structure, a larger chip having more nozzles can be readily prepared with high yield. For example, a chip including 1,000 nozzles can be formed by this method. In the case of making a probe array having 1,000 probes using this chip, the liquid discharging device has a simple structure because this method does not require alignment of a plurality of chips and bonding these chips to a component of the liquid discharging device.

Figure 43:
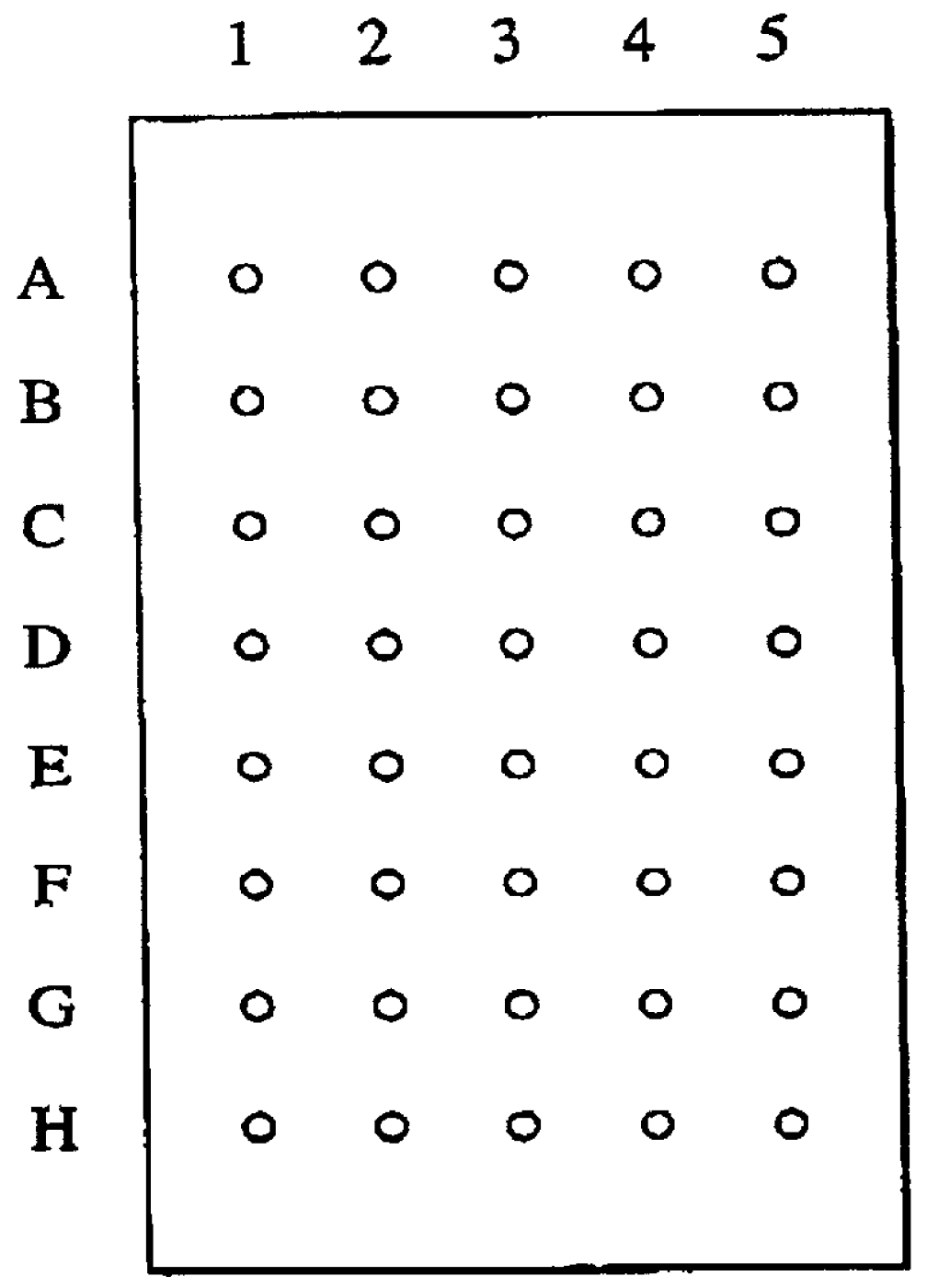

According to the above-described method, the probe array has a probe density which is higher than the nozzle density of the liquid discharging device. Alternatively, the probe density of the probe array and the nozzle density of the liquid discharging device may be the same. In such a case, it is unnecessary that the nozzle arrangement has the offset arrangement shown in FIG. 43 and that the liquid discharging device is scanned.

(Another Method for Applying Probe Solution Using Thermal-Jet Liquid Discharge Unit)

Figure 44:
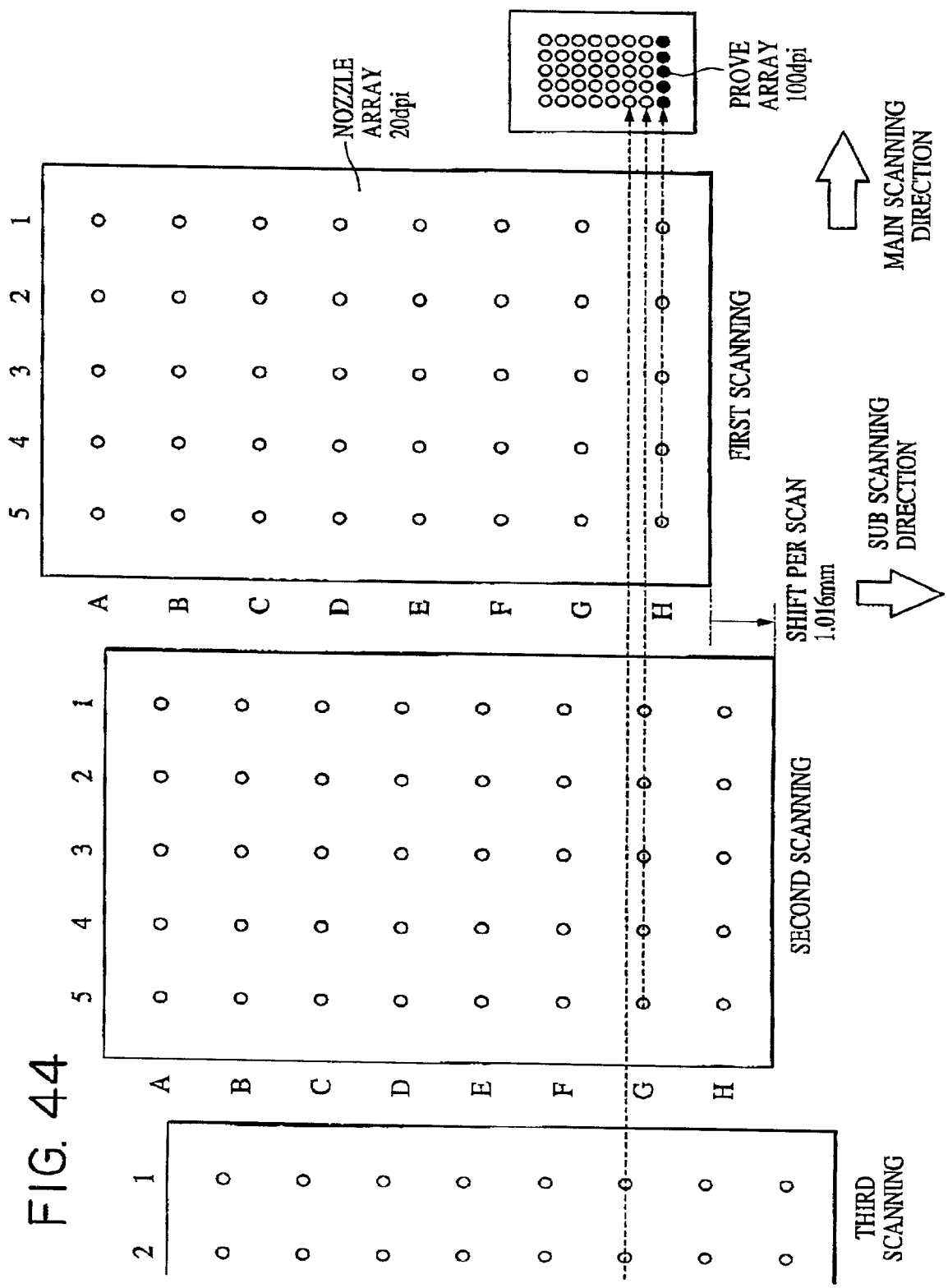
FIG. 44 is a schematic view illustrating another coating process of the probe solution using the thermal-jet liquid discharging device.

Another method for making a probe array will now be described. In this method, nozzles are arranged orthogonally. Using a liquid discharging device having a configuration shown in FIG. 44, a probe array having a probe density which is higher than the nozzle density will now be described. In the following embodiment, a probe array with density of 100 dpi is prepared using a chip having a nozzle density 20 dpi (an internozzle distance of 1.27 mm). As shown in FIG. 44, the distance between the probes in the probe array is 100 dpi for a nozzle pitch of 20 dpi. Thus, these probes cannot be formed by one discharge operation. When the chip has a nozzle arrangement of eight lines and five rows shown in FIG. 43, this discharge operation must be repeated eight times to complete the probe array. In one discharge operation, the liquid discharging device is scanned in the main scanning direction. When the five nozzles in an array reach predetermined positions (corresponding to 100 dpi), the heaters are energized to form a probe row arranged in the transverse direction at 100 dpi.

In FIG. 44, the probes which are discharged at the first scanning operation are represented by black circles. The probes in the bottommost line are formed by the first scanning operation. Herein, the probe solutions are discharged from the nozzles in the H-th line of the chip. The head is moved by 1.016 mm in the sub scanning direction and a second scanning operation is performed as in the first scanning operation to form probes in the second line from the bottommost. Herein, the probe solutions are discharged from the nozzles in the G-th line of the chip. Five probes are formed during one scanning operation. This operation is repeated while moving the jet head in the vertical direction and sequentially discharging the probe solutions from nozzles at different lines to complete eight probe lines (100 dpi) in the vertical direction. Accordingly, this method can form a probe array of eight lines and five rows at a probe pitch of 0.254 mm (100 dpi) using a chip having a nozzle array of eight lines and five rows with a nozzle pitch 1.27 mm (20 dpi). The number and the arrangement of the nozzles are not limited in the present invention. A probe array having a desired number of probes can be produced in a similar procedure. In the method described above, the probe solutions must be discharged from these nozzles with a desired timing. Heaters corresponding to these nozzles can be independently controlled. One end of each heater is connected to a common line and the other end thereof is connected to an independent line.

EXAMPLES

The present invention will now be described in more detail with reference to the following EXAMPLES which represent the present invention, but do not limit the present invention.

Preparatory Examples

A. Preparation of Solid-Phase Substrate

A fused quartz substrate of 25.4 mm×25.4 mm×0.5 mm was cleaned in a 1% ultrasonic detergent GP-111 (made by Branson) for 20 minutes while applying ultrasonic waves. The substrate was washed with water while applying ultrasonic waves and then cleaned with running water. The substrate was then immersed in an aqueous 1N NaCl solution for 20 minutes at 80° C., and washed with running tap water, with deionized water while applying ultrasonic waves, and with ultra-pure running water.

An aminosilane coupling agent KBM-603 (N-(β-aminoethyl)-γ-aminopropyltrimethoxysilane made by Shin-Etsu Chemical Co., Ltd., hereinafter referred to as Compound I) was purified by reduced-pressure distillation and a 1% aqueous solution thereof was stirred for 1 hour at room temperature to hydrolyze the methoxy groups. The above substrate was immersed into this aqueous silane coupling agent solution for 1 hour at room temperature, washed with ultra-pure running water, dried in a nitrogen stream, and heated for 1 hour in an oven at 120° C.

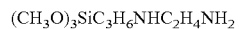  Compound I $(CH_3O)_3SiC_3H_6NHC_2H_4NH_2$

After cooling, the substrate was immersed in a 0.3% N-(6-maleimidecaproyloxy)succinimide (EMCS: Compound II) in ethanol/dimethylsulfoxide (1:1) solution for 2 hours at room temperature to allow EMCS to react with the amino group of the aminosilane coupling agent. After the completion of the reaction, the substrate was washed with an ethanol/ dimethylsulfoxide (1:1) mixture once and then with ethanol three times, and was dried in a nitrogen stream.

Compound II

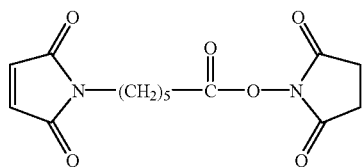

B. Preparation of Probe

5'-ATGAACCGGAGGCCCATC-3' Base Sequence (1) (SEQ ID No. 1)

3'-TACTTGGCCTCCGGGTAG-5' Base Sequence (2) (SEQ ID No. 2)

An oligonucleotide (Compound III: made by BEX) was used as a probe. This oligonucleotide contains Base Sequence (2) which is complementary to Base Sequence (1), and has a mercapto group (SH group) via a linker at the 5' end, and the mercapto group is reactive with the maleimide group fixed on the substrate surface.

Compound III

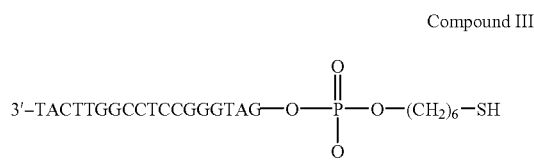

The oligonucleotide (Compound III) was dissolved into an aqueous solution containing 7.5 weight percent glycerin, 7.5 weight percent urea, 7.5 weight percent thiodiglycol, and 1 weight percent acetylene alcohol (Compound IV, trade name: Acetylenol EH made by Kawaken Fine Chemicals Co., Ltd.) to prepare an oligonucleotide solution having an absorbance of 1.0.

Compound IV

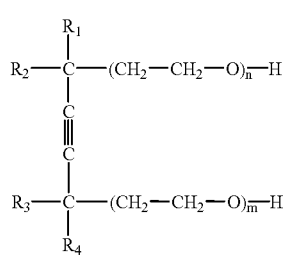

C. Preparation of Many Types of Probe

5'-ATGAACCGGAGGCCCATC-3' Base Sequence (3) (SEQ ID No. 1)

3'-TACTTGGCCTCCGGGTAG-5' Base Sequence (4) (SEQ. ID No. 2)

Base Sequence (3) is the same as Base Sequence (1), but is actually an 18 nucleotide region which contains four base portions (indicated by italics) coding two amino acids having high mutation frequency of cancer-related gene p53. Base Sequence (4), which is the same as Base Sequence (2), is completely complementary to Base Sequence (3), and portions corresponding to the italicized portions in Base Sequence (3) are italicized.

(SEQ ID No. 3)
5'-GATGGG$^1$-N$^2$TCN$^3$N$^4$GTTCAT-3' Base Sequence (5)

$N^1$, $N^2$, $N^3$, and $N^4$ in Base Sequence (5) represent bases at the underlined portions in Base Sequence (4). Next, 256 types of oligonucleotide were synthesized in which any one of the A, T, G, and C bases was substituted for $N^1$, $N^2$, $N^3$, and $N^4$, and the 5' end was terminated with a mercapto group as in the above procedure B.

Example 1

Fabrication of ZBJ Head Block for Discharging Probe Solution

A ZBJ head having an array of 50×50 nozzles at 100-dpi pitch and formed as shown in FIG. 6 was fabricated by the method described in Japanese Laid-Open Patent No. 6-40037 (the thickness of the silicon substrate was 1 mm). The area of the nozzles formed was 12.7 mm×12.7 mm and included 2,500 nozzles. The diameter of the opening 111 of each nozzle tip was 50 µm so that the nozzle discharged 24 picoliters of a standard ink. The ink channels 113 and 114 were used as reservoirs for the probe solutions. The reservoir 114 had an inner diameter of about 200 µm and a depth of about 800 µm, and thus a volume of about 0.25 µl Accordingly, about 10,000 arrays could be produced using the solution contained in this reservoir 114.

Example 2

The oligonucleotide solution prepared in the above procedure B was supplied to 256 (=16×16) square reservoirs of the ZBJ head fabricated in EXAMPLE 1 using a microdispenser. Prior to this process, the reservoirs and nozzles of the ZBJ head were washed with the above solvent and with an oligonucleotide solution, if necessary, and evacuated to remove the solution so that the head had high affinity with the solvent.

The oligonucleotide solution was discharged onto the maleimide-treated substrate. This ZBJ head can discharge a droplet of 24 picoliters, and thus a dot from the droplet applied onto the substrate had a diameter in the range of 70 to 100 µm, depending on the viscosity of the solution used. The pattern and the dot density were the same as those of the nozzle array of the head.

The above solvent had high moisture retention which prevented the oligonucleotide solution applied onto the substrate from drying and becoming concentrated in the reservoirs, and from drying and solidifying before fixing by the reaction with the substrate surface in the next step The substrate on which the oligonucleotide (Compound III) solution was applied in a two-dimensional array was held in a 100%-humidity chamber at room temperature for 1 hour to allow the mercapto group of the oligonucleotide to react with the maleimide group on the substrate. The substrate was washed with running ultra-pure water for about 30 seconds.

This substrate was immersed into a blocking solution for 1 hour to block areas other than the dots. The blocking solution contained a 50-mM phosphate buffer solution (pH =7.0, containing 0.1M NaCl) and 2% bovine serum albumin (BSA) made by Sigma-Aldrich Japan K.K. The substrate was then washed with the 50-mM phosphate buffer solution and stored in the 50-mM phosphate buffer solution.

Example 3

Evaluation of Dot Shape in DNA Array by Hybridization

Using DNA Compound V (made by BEX) as a model target DNA, a hybridization reaction with the probes in the two-dimensional array prepared in EXAMPLE 2 was performed. DNA Compound V contains Base Sequence (1) above and the 5' end is labeled with fluorescent tetramethylrhodamine.

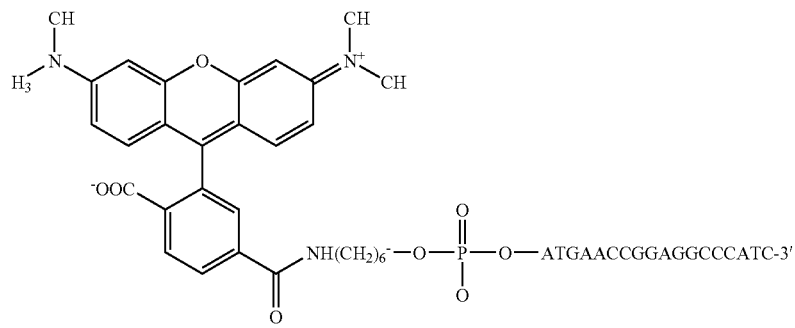

Compound V [Containing Base Sequence (1)]

The hybridization reaction was performed using the DNA array prepared in EXAMPLE 2 and 2 ml of a phosphate buffer solution (10-mM phosphate buffer solution, pH=7.0, containing 50-mM NaCl) containing 5 nM of Compound V in a HYBRIPACK. The substrate and the model target DNA solution in the HYBRIPACK were heated in the oven to 70° C., then cooled to 50° C. and allowed to stand for 10 hours.

The substrate was removed from the HYDRIPACK and washed with the hybridization buffer solution to remove the unreacted target DNA. The substrate covered with the buffer solution was placed onto a glass slide and covered with a cover glass to observe fluorescence from the fluorescent label using a ECLIPSE E800 fluorescent microscope (made by Nikon Corporation) with a 20× objective lens (planapochromat) and a fluorescent filter (Y-2E/C). The image observed with the fluorescent microscope was stored using a CCD camera equipped with an image intensifier (C2400-87 made by Hamamatsu Photonics K.K.) and an image processing device (Argus 50 made by Hamamatsu Photonics K. K.).

The stored image showed that all the dots hybridized with Compound V in the two-dimensional array on the substrate fluoresced. The average fluorescence intensity thereof was 1,750, which was the light intensity index of the above instrument. The average dot diameter determined by the fluorescent areas was about 100 μm.

Example 4

Solutions of 256 types of oligonucleotide probe prepared in the above procedure C were prepared as in the above procedure A and discharged onto a glass substrate as in EXAMPLE 2 to produce a two-dimensional DNA probe array including 256 DNA probes.

Example 5

Evaluation of Selectivity of Target DNA by Hybridization

Using the array including 256 DNA probes prepared in EXAMPLE 4, a hybridization reaction was performed as in EXAMPLE 3 to verify the selectivity of the target DNAs having objective base sequences.

Four model target DNAs were synthesized. These DNAs had the following base sequences and the 5' ends of the DNAS were labeled with fluorescent tetramethylrhodamine as in EXAMPLE 3.

```
5'-ATGAACCGGAGGCCCATC-3'   Base Sequence (3)  (SEQ ID No. 1)

5'-ATGAACGGGAGGCCCATC-3'   Base Sequence (6)  (SEQ ID No. 4)
                                                     C→G 5'-ATGAACGCGAGGCCCATC-3'   Base Sequence (7)  (SEQ ID No. 5)
                                                   C→G, G→C 5'-ATGAACGCGAAGCCCATC-3'   Base Sequence (8)  (SEQ ID No. 6)
                                                C→G, G→C, G→A
```

As shown above, Base Sequence (3) is completely complementary to the normal sequence of the p53 gene. Base Sequences (6), (7), and (8) are mutant models of Base Sequence(3) and the underlined parts indicate base substitution.

For each of these target DNAs of Base Sequences (3), (6), (7), and (8), hybridization was performed as in EXAMPLE 3. Fluorescence was observed only from those dots having base sequences which were completely complementary to the corresponding target DNAs among the dots in the DNA array prepared in EXAMPLE 4. The intensity of the fluoresced dots was 1,830 for target DNA (3), 1,270 for target DNA (6), 1,520 for target DNA (7), and 1,940 for target DNA (8).

The intensity for target DNA (3) agrees with the average of 1,750 in EXAMPLE 3 within statistical error. Also, the differences in fluorescent intensity between the other three target DNAs are not significant. Accordingly, in the DNA array produced by applying probe solutions sequentially onto a substrate using an array liquid discharging device based on the manufacturing method of the present invention, the amount of each fixed probe is sufficiently uniform and reproducible for use in the quantitative determination of the target DNA.

Example 6

An apparatus for making a probe array having the liquid discharging device described in the second embodiment was prepared.

The oligonucleotide solution prepared in the above procedure B was supplied to reservoirs of the liquid discharging device using a microdispenser. Prior to this process, the reservoirs and nozzles of the liquid discharging device were washed with the above solvent and with an oligonucleotide solution, if necessary, and evacuated to remove the solution so that these components had a high affinity with the solvent.

The oligonucleotide solution was discharged onto the maleimide-treated substrate prepared in the above procedure A. This liquid discharging device can discharge a droplet of 24 picoliters, and thus a dot from the droplet applied onto the substrate had a diameter in the range of 70 to 100 μm, depending on the viscosity of the solution used The substrate on which the oligonucleotide (Compound III) solution was applied in a two-dimensional array was held in a 100%-humidity chamber at room temperature for 1 hour to allow the mercapto group of the oligonucleotide to react with the maleimide group on the substrate. The substrate was washed with running ultra-pure water for about 30 seconds.

This substrate was immersed into a blocking solution for 1 hour to block areas other than the dots. The blocking solution contained a 50-mM phosphate buffer solution (pH=7.0, containing 0.1M NaCl) and 2% bovine serum albumin (BSA) made by Sigma-Aldrich Japan K.K. The substrate was then washed with the 50-mM phosphate buffer solution and stored in the 50-mM phosphate buffer solution.

Evaluation of Dot Shape in DNA Array by Hybridization

Using DNA Compound V (made by BEX) as a model target DNA, a hybridization reaction with probes in the two-dimensional array was performed. DNA Compound V contains Base Sequence (1) above and the 5' end is labeled with fluorescent tetramethylrhodamine.

The hybridization reaction was performed using the DNA array and 2 ml of a phosphate buffer solution (10-mM phosphate buffer solution, pH=7.0, containing 50-mM NaCl) containing 5 nM of Compound V in a HYBRIPACK. The substrate and the model target DNA solution were heated in the HYBRIPACK to 70° C., then cooled to 50° C. and allowed to stand for 10 hours.

The substrate was removed from the HYBRIPACK and washed with the hybridization buffer solution to remove the unreacted target DNA. The substrate covered with the buffer solution was placed onto a glass slide and covered with a cover glass to observe fluorescence from the fluorescent label using a ECLIPSE E800 fluorescent microscope (made by Nikon Corporation) with a 20× objective lens (planapochromat) and a fluorescent filter (Y-2E/C). The image observed with the fluorescent microscope was stored using a CCD camera equipped with an image intensifier (C2400-87 made by Hamamatsu Photonics K. K.) and an image processing device (Argus 50 made by Hamamatsu Photonics K. K.).

The stored image showed that all the dots hybridized with Compound V in the two-dimensional array on the substrate fluoresced. The average fluorescence intensity thereof was 1,750, which was the light intensity index of the above instrument. The average dot diameter determined by the fluorescent areas was about 100 μm.

The oligonucleotide probe synthesized in the above procedure C was discharged onto a glass substrate using the liquid discharging device to produce a two-dimensional DNA probe array including 256 DNA probes. Among the 1,000 nozzles of the liquid discharging device, 256 nozzles were used in this process.

Evaluation of Selectivity of Target DNA by Hybridization

Using the array including 256 DNA probes, a hybridization reaction was performed to verify the selectivity of the target DNAs having objective base sequences.

The four model target DNAS synthesized in EXAMPLE 5 were used. Each DNA contained Base Sequence (3), (6), (7), or (8) and the 5' end was labeled with fluorescent tetramethylrhodamine.

As described above, Base Sequence (3) is completely complementary to the normal sequence of the p53 gene. Base Sequences (6), (7), and (8) are mutant models of Base Sequence(3) and the underlined parts indicate base substitution.

For each of these target DNAs of Base Sequences (3), (6), (7), and (8), hybridization was performed. Fluorescence was observed only from those dots having base sequences which were completely complementary to the corresponding target DNAs among the dots in the prepared DNA array. Regarding the intensity of the fluoresced dots, the results for these target DNAs were similar to those in EXAMPLE 5.

Namely, the differences in fluorescent intensity between these target DNAs are not significant. Accordingly, in the DNA array produced by applying probe solutions sequentially onto a substrate using an array liquid discharging device based on this manufacturing method, the amount of each fixed probe is sufficiently uniform and reproducible for use in the quantitative determination of the target DNA.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid discharging device comprising:
a first substrate comprising a first surface having a plurality of energy generators for generating energy for discharging a liquid, and a second surface having a plurality of liquid supply openings arranged on the opposite side of said first surface, each supply opening corresponding to one of a plurality of first penetrating holes of the first substrate;
a nozzle member provided on said first surface side of said first substrate and having a plurality of liquid discharge nozzles; and
a second substrate laminated on said second surface side of said first substrate and having a plurality of second penetrating holes which continue through the second substrate,
wherein each one of said plurality of second penetrating holes is in communication with a supply opening of a corresponding one of said plurality of first penetrating holes, to form a plurality of individual flow paths that are independent from one another, each flow path comprising a single second penetrating hole, a single first penetrating hole, a single nozzle, and a single channel that communicates with the nozzle and the first penetrating hole,
wherein a position of the nozzle is not aligned with a position of the first penetrating hole,
and wherein each energy generator of the plurality of energy generators is positioned adjacent to a corresponding channel and a corresponding nozzle.

2. A liquid discharging device according to claim 1, wherein each of said plurality of first penetrating holes is shaped such that it narrows.

3. A liquid discharging device according to claim 1, wherein each of said plurality of first penetrating holes is shaped as a truncated quadrangular pyramid.

4. A liquid discharging device according to claim 1, wherein said plurality of discharge nozzles are arranged as lines and rows on a surface of said first substrate, and wherein a distance between lines of each of said plurality of liquid discharge nozzles is the same, and a distance between rows of each of said nozzles is the same within a substrate.

5. A liquid discharging device according to claim 1, wherein said plurality of discharge nozzles are arranged as lines and rows on a surface of said first substrate, and wherein a linear distance and a row distance between adjoining ones of said plurality of liquid discharge nozzles are the same within a substrate.

6. A liquid discharging device according to claim 1, wherein each of said plurality of energy generators is a piezo element.

7. A liquid discharging device according to claim 1, wherein each of said plurality of energy generators is a thermal energy generator.

8. A liquid discharging device according to claim 1, wherein said first substrate is silicon.

9. A liquid discharging device according to claim 8, wherein said plurality of first penetrating holes are formed by anisotropic etching of said silicon substrate using a tetramethylammonium hydroxide (TMAH) solution.

10. A liquid discharging device according to claim 1, wherein said first substrate is a silicon wafer and said second substrate is made of alumina or resin.

11. The liquid discharging device according to claim 1, wherein each of the plurality of discharge nozzles is formed in said first substrate to be within an area which is in line with a corresponding one of the plurality of supply openings.

12. A liquid discharging device according to claim 1, wherein the plurality of nozzles are arranged in lines and positions of discharge openings in adjacent lines are shifted by a predetermined pitch in a direction of the line.

* * * * *

SEQUENCE LISTING

<160> NUMBER OF SEQ ID NOS: 6

<210> SEQ ID NO 1
<211> LENGTH: 18
<212> TYPE: DNA
<213> ORGANISM: Artificial Sequence
<220> FEATURE:
<223> OTHER INFORMATION: Base Oligonucleotide for preparation of a probe

<400> SEQUENCE: 1
atgaaccgga ggcccatc                                                 18

<210> SEQ ID NO 2
<211> LENGTH: 18
<212> TYPE: DNA
<213> ORGANISM: Artificial Sequence
<220> FEATURE:
<223> OTHER INFORMATION: Oligonucleotide probe for hybridization assay

<400> SEQUENCE: 2
tacttggcct ccgggtag                                                 18

<210> SEQ ID NO 3
<211> LENGTH: 18
<212> TYPE: DNA
<213> ORGANISM: Artificial Sequence
<220> FEATURE:
<223> OTHER INFORMATION: Oligonucleotide probe for hybridization assay
<220> FEATURE:
<221> NAME/KEY: misc_feature
<222> LOCATION: (1)..(18)
<223> OTHER INFORMATION: n=a, t, g, or c

<400> SEQUENCE: 3
gatgggnntc nngttcat                                                 18

<210> SEQ ID NO 4
<211> LENGTH: 18
<212> TYPE: DNA
<213> ORGANISM: Artificial Sequence
<220> FEATURE:
<223> OTHER INFORMATION: Oligonucleotide probe for hybridization assay

<400> SEQUENCE: 4
atgaacggga ggcccatc                                                 18

<210> SEQ ID NO 5
<211> LENGTH: 18
<212> TYPE: DNA
<213> ORGANISM: Artificial Sequence
<220> FEATURE:
<223> OTHER INFORMATION: Oligonucleotide probe for hybridization assay

<400> SEQUENCE: 5
atgaacgcga ggcccatc                                                 18

<210> SEQ ID NO 6
<211> LENGTH: 18
<212> TYPE: DNA
<213> ORGANISM: Artificial Sequence
<220> FEATURE:
<223> OTHER INFORMATION: Oligonucleotide probe for hybridization assay

<400> SEQUENCE: 6
atgaacgcga agcccatc                                                 18